(12) United States Patent  (10) Patent No.: US 7,825,554 B2
Bastian, II et al.  (45) Date of Patent: Nov. 2, 2010

(54) STABILIZING POWER SOURCE FOR A VEHICLE

(75) Inventors: William Allen Bastian, II, Carmel, IN (US); Elizabeth Sobota, Greenfield, IN (US)

(73) Assignee: Bastian Family Holdings, Inc., Carmel, IN (US)

( * ) Notice: Subject to any disclaimer, the term of this patent is extended or adjusted under 35 U.S.C. 154(b) by 622 days.

(21) Appl. No.: 11/230,962

(22) Filed: Sep. 20, 2005

(65) Prior Publication Data

US 2007/0062543 A1  Mar. 22, 2007

(51) Int. Cl.
H02K 57/00 (2006.01)
H02K 47/00 (2006.01)
H02K 7/09 (2006.01)
B64C 17/00 (2006.01)

(52) U.S. Cl. .................. 310/74; 310/90.5; 244/12.2; 244/23 C; 244/53 R

(58) Field of Classification Search .................. 310/74, 310/90.5; 244/12.2, 23 C, 12.1, 79
See application file for complete search history.

(56) References Cited

U.S. PATENT DOCUMENTS

| | | | | |
|---|---|---|---|---|
| 3,097,818 A | * | 7/1963 | Heller | 244/169 |
| 3,437,290 A | * | 4/1969 | Norman | 244/12.2 |
| 3,480,811 A | * | 11/1969 | Grosbard | 310/156.38 |
| 3,502,946 A | * | 3/1970 | Kimura | 361/141 |
| 3,704,540 A | | 12/1972 | Montagu | |
| 3,732,645 A | | 5/1973 | Winston | |
| 3,888,553 A | * | 6/1975 | Wehde | 310/90.5 |
| 3,915,416 A | * | 10/1975 | Anderson et al. | 244/165 |
| 4,004,759 A | | 1/1977 | Hund | |
| 4,065,189 A | | 12/1977 | Sikorra | |
| 4,193,568 A | * | 3/1980 | Heuvel | 244/23 C |
| 4,285,553 A | * | 8/1981 | Robinson | 310/90.5 |
| 4,291,248 A | * | 9/1981 | Rainbolt | 310/14 |
| 4,370,004 A | * | 1/1983 | Morikawa et al. | 310/90.5 |
| 4,461,436 A | | 7/1984 | Messina | |
| 4,470,644 A | * | 9/1984 | Weisser | 310/90.5 |
| 4,486,038 A | * | 12/1984 | Bredenkamp | 290/1 R |
| 4,609,165 A | | 9/1986 | Logan et al. | |
| 4,723,735 A | * | 2/1988 | Eisenhaure et al. | 244/165 |
| 4,807,830 A | * | 2/1989 | Horton | 244/12.2 |
| 5,072,892 A | * | 12/1991 | Carrington | 244/23 C |
| 5,208,522 A | * | 5/1993 | Griepentrog et al. | 318/611 |
| 5,319,275 A | | 6/1994 | Tozoni | |

(Continued)

OTHER PUBLICATIONS

"Engineering—Biggest Cruiser. Tallest Coaster. Big, Tall Building that Shakes Off Quakes", *Popular Science*, Dec. 2003, 1 pg.

(Continued)

*Primary Examiner*—Burton Mullins
(74) *Attorney, Agent, or Firm*—Barnes & Thornburg

(57) ABSTRACT

A power source for a vehicle includes at least one toroidal ring positioned in a housing. The toroidal ring includes magnetic material such as permanent magnets. The toroidal ring is magnetically levitated in the housing. A propulsion winding is coupled with the housing and energizable via a power signal to move the toroidal ring. Once moving, the magnetic material and the propulsion winding cooperate to produce electrical power and/or provide a stabilizing effect for the vehicle. In some applications, such as in an aircraft application, two or more toroidal rings may be used and rotated at counter directions so as to produce a predetermined net angular momentum.

62 Claims, 12 Drawing Sheets

U.S. PATENT DOCUMENTS

| | | | |
|---|---|---|---|
| 5,351,913 A | | 10/1994 | Cycon et al. |
| 5,421,538 A | | 6/1995 | Vassa |
| 5,477,092 A | * | 12/1995 | Tarrant ........................ 310/43 |
| 5,479,145 A | | 12/1995 | Kalsi |
| 5,507,453 A | * | 4/1996 | Shapery ..................... 244/12.5 |
| 5,595,358 A | | 1/1997 | Demidov et al. |
| 5,611,505 A | | 3/1997 | Smay |
| 5,637,939 A | * | 6/1997 | Serdar et al. .................. 310/74 |
| 5,660,356 A | | 8/1997 | Selfors et al. |
| 5,731,645 A | * | 3/1998 | Clifton et al. ................. 310/74 |
| 5,921,505 A | | 7/1999 | Spector |
| 6,019,319 A | | 2/2000 | Falbel |
| 6,113,033 A | | 9/2000 | Parks et al. |
| 6,118,193 A | | 9/2000 | Morris |
| 6,252,317 B1 | | 6/2001 | Scheffer et al. |
| 6,377,352 B1 | | 4/2002 | Coronato et al. |
| 6,404,089 B1 | * | 6/2002 | Tomion ...................... 310/162 |
| 6,464,459 B2 | | 10/2002 | Illingworth |
| 6,575,401 B1 | * | 6/2003 | Carver ....................... 244/12.2 |
| 6,588,701 B2 | | 7/2003 | Yavnai |
| 6,604,706 B1 | | 8/2003 | Bostan |
| 6,616,094 B2 | | 9/2003 | Illingworth |
| 6,617,738 B2 | * | 9/2003 | Dickinson ................... 310/178 |
| 6,664,880 B2 | | 12/2003 | Post |
| 6,691,949 B2 | | 2/2004 | Plump et al. |
| 6,758,146 B2 | | 7/2004 | Post |
| 6,779,759 B1 | | 8/2004 | Klupar et al. |
| 7,032,861 B2 | * | 4/2006 | Sanders et al. ............ 244/23 A |
| 7,410,123 B2 | * | 8/2008 | Nunnally .................. 244/23 C |
| 2001/0040062 A1 | | 11/2001 | Illingworth |
| 2001/0048877 A1 | | 12/2001 | Illingworth et al. |
| 2002/0014554 A1 | | 2/2002 | Kirjavainen |
| 2002/0047071 A1 | | 4/2002 | Illingworth |
| 2002/0145076 A1 | | 10/2002 | Alford |
| 2002/0182077 A1 | | 12/2002 | Reinfeld et al. |
| 2002/0182078 A1 | | 12/2002 | Reinfeld et al. |
| 2003/0217668 A1 | | 11/2003 | Fiske et al. |
| 2004/0069901 A1 | | 4/2004 | Nunnally |
| 2004/0094662 A1 | | 5/2004 | Sanders, Jr. et al. |
| 2004/0129828 A1 | | 7/2004 | Bostan |
| 2005/0082421 A1 | * | 4/2005 | Perlo et al. ................. 244/12.2 |
| 2007/0252033 A1 | * | 11/2007 | Bojiuc ......................... 244/62 |

OTHER PUBLICATIONS

M. Stroh, "Speed vs. Need—Maglev tech finally leaves the station.", *News Files*, 1 pg.

C. Hoffman, "G", *Popular Science*, Apr. 2004, 3 pgs.

C. Stuart, "Stabilizing MEMS systems lifts hovering vehicle's chances", *Smalltimes*, Sep. 2004, 1 pg.

F. Saunders, "Flying Doughnut", 1 pg.

"The Verdict—3 Radical Ideas but any Real Science? We Ask the Experts.", *What's New*, 1 pg.

P. Waldman, "Great Idea . . . if it Flies—Inventor Spends a Lifetime to Create a Jetsons-Style 'Skycar'", *Inventions*, 1 pg.

K. Maney, "He has a vision, but does he have the Wright stuff?—Entrepreneuer dreams of day we can all fly solo", *Esquire*, Dec. 2003, 5 pgs.

G. Andrews, "His rare expertise attracts clients—Magnetics specialist puts skills to use as consultant", 1 pg.

F. C. Moon, "Superconducting Levitation", *John Wiley & Sons*, New York, NY, 1994, 12 pgs.

PCT Search Report for International Application No. PCT/US06/34178, Feb. 15, 2008.

M. Anders, "Engineering—Biggest Cruiser. Tallest Coaster. Big, Tall Building that Shakes Off Quakes", *Popular Science*, Dec. 1, 2003, 1 pg.

M. Stroh, "Speed vs. Need—Maglev tech finally leaves the station.", *News Files*, Apr. 1, 2003, 1 pg.

F. Saunders, "Flying Doughnut", *Discover*, Jan. 1, 1998, 1 pg.

"The Verdict—3 Radical Ideas but any Real Science? We Ask the Experts./SkyTran Public Transportation", *Popular Science*, Feb. 26, 2003, 1 pg.

P. Waldman, "Great Idea . . . if it Flies—Inventor Spends a Lifetime to Create a Jetsons-Style 'Skycar'", *Wall Street Journal*, Jun. 24, 1999, 1 pg.

K. Maney, "He has a vision, but does he have the Wright stuff?", *USA Today*, Mar. 30, 2004, 5 pgs.

G. Andrews, "His rare expertise attracts clients—Magnetics specialist puts skills to use as consultant", *Indiana Business Journal*, Mar. 31-Apr. 6, 2003, 1 pg.

T. Gray, "Ignorance=Maglev=Bliss—For 150 years scientist believed that stable magnetic levitation was impossible. Then Roy Harrigan came along." *Popular Science*, Feb. 1, 2004, 1 pg.

John H. Glenn Research Center, "High-Temperature Coils for Electromagnets—High-temperature coils can be made more compact than before.", *NASA Tech Briefs*, Aug. 2002., 2 pgs.

S. Gurol et al., "The General Atomics Low Speed Urban Maglev Technology Development Program", *TRB 2003 Annual Meeting CD-ROM*, Jan. 2003, 24 pgs.

W. Wang et al., "Design of High-Speed Permanent Magnet Machine for Small Flywheels", NASA Grant No. NAG3-2598, May 2003, 7 pgs.

"Compendium of Executive Summaries from the Maglev System Concept Definition Final Reports", *Imported from* http://ntl.bts.gov/DOCS/CES.html, Mar. 1993, 91 pgs.

M. Thompson et al., "Scale Model Flux-Cancelling EDS Maglev Suspension—Part I: Design and Modeling", *IEEE Transactions on Magnetics*, vol. 35, No. 3, May 1999, pp. 1956-1963.

M. Bowler, "Flywheel Energy Systems: Current Status and Future Prospects", *Magnetic Material Producers Association Joint Users Conference*, Sep. 22-23, 1997, pp. 1-3.

G. Chandler, "The Pentagon's Flying Saucer Problem", *Air & Space (Magazine)*, May 1, 2003, pp. 69 and 70.

http://www.usafflyingsaucers.com;photos (website no longer exists), Aug. 1, 2004, 7 pgs.

B. McMahon, "Paul Moller", *Esquire*, Dec. 2003, 3 pgs.

\* cited by examiner

STABILIZING POWER SOURCE FOR A VEHICLE

TECHNICAL FIELD

The present invention relates generally to an apparatus for supplying power to and/or stabilizing a vehicle and, more particularly, to an apparatus for supplying electrical power to and/or stabilizing a vehicle such as an aircraft.

BACKGROUND

Vehicles, including cars, trains, boats, and aircraft, derive power from one or more of a number of types of primary power sources. Typical primary power sources include exothermic sources such as gas and diesel engines and electrical sources such as electrical generators, batteries, and fuel cells. Some of these power sources may be inefficient, produce undesirable hydrocarbon byproducts, or otherwise be limited to specific applications.

SUMMARY

The present invention comprises one or more of the features recited in the appended claims and/or the following features which, alone or in any combination, may comprise patentable subject matter:

According to one aspect, an apparatus for providing electrical power to a vehicle includes a toroidal ring. The toroidal ring may be positioned in a toroidal cavity of a housing. A magnetic material, such as permanent solid magnets or magnetic powder, may be coupled with the toroidal ring. A propulsion winding may be coupled with the housing. The propulsion winding may be embodied as one or more electromagnets. The propulsion winding may be configured to produce an alternating magnetic field when energized so as to cause the toroidal ring to rotate within the toroidal cavity. A levitation winding may also be coupled with the housing. The levitation winding may be configured to produce a magnetic field to levitate the toroidal ring in the toroidal cavity by repulsing and/or attracting the magnetic material. The levitation winding may be embodied as one or more electromagnets and/or a conductive guideway formed from laminated sections of conductive materials, Litz wire, or the like. That is, in some embodiments, the levitation winding may be passive and generate the magnet field to levitate the toroidal ring via an induced current created by the rotation of a portion of the magnetic material across the levitation winding.

Once the toroidal ring is rotating, the toroidal ring may provide a stabilizing effect to the vehicle. Additionally, once the toroidal ring is rotated to a minimum operational speed, the propulsion winding may be used in cooperation with the magnetic material to form an electrical generator. That is, the rotation of the magnetic field produced by the magnetic material across the propulsion winding generates a current in the propulsion winding. The propulsion winding and, in some embodiments, the levitation winding may be energized via an energizing signal produced by a control circuit. The energizing signal may be a direct current or an alternating current signal. The control circuit may produce the energizing signals from an external power source or from the power supplied by the toroidal ring itself (i.e., when acting as an electrical generator). For example, an external power source may be coupled to the control circuit and used to initially levitate the toroidal ring and rotate the toroidal ring to a predetermined operational rotational speed. Such predetermined operational rotational speed may include any rotation speed value. Once the toroidal ring is at the predetermined operational rotational speed, the external power source may be removed or otherwise decoupled from the control circuit. The control circuit may then use the electrical power produced by the toroidal ring (i.e., via the cooperation of the magnetic material and the propulsion winding) to supply electrical power to other circuits such as instruments, sensors, and other electromagnets or to other devices such as motors, actuators, or other prime mover devices to produce mechanical work or the like.

In some embodiments, two or more toroidal rings may be positioned vertically over each other. For example, the housing may include two toroidal cavities. The first toroidal cavity may be positioned vertically over the second toroidal cavity. A toroidal ring is positioned in each cavity such that one toroidal ring is positioned vertically over the other. Propulsion and levitating windings may be coupled with the housing to produce a levitating magnetic field and an alternating magnetic field in each toroidal cavity. The alternating magnetic field causes each toroidal ring to rotate. In some applications such as aircraft and other vehicles, the toroidal rings are rotated in opposite directions and at approximately the same speed to produce minimal net angular momentum. Alternatively or additionally, the toroidal rings may be rotated in the same direction or in opposite directions but at different speeds to provide a stabilizing effect to the aircraft. The control circuit produces energizing signals to control the functionality of the windings.

According to another aspect, an aircraft includes a fuselage and a housing surrounding the fuselage. The housing may have one or more toroidal cavities defined therein. A toroidal ring may be positioned in each of the cavities. A number of propulsion windings may be coupled with the housing. The propulsion windings may be configured to generate an alternating magnetic field in each of the toroidal cavities to rotate each of the toroidal rings in response to another energizing signal. A number of levitation windings may also be coupled with the housing. The levitation windings may be configured to generate a levitating magnetic field in each of the toroidal cavities in response to an energizing signal or via an induced current. Some of the toroidal rings may be rotated in counter or opposite directions. A control circuit may be configured to generate the energizing signal. The control circuit may, at predetermined times, use an external power source to generate some of the energizing signals. The control circuit may also use the power generated by the toroidal ring(s) to generate some of the energizing signals and to supply power to other circuits, electromagnets, devices, motors, actuators, or other prime movers.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which.

DETAILED DESCRIPTION OF THE DRAWINGS

Figure 1:
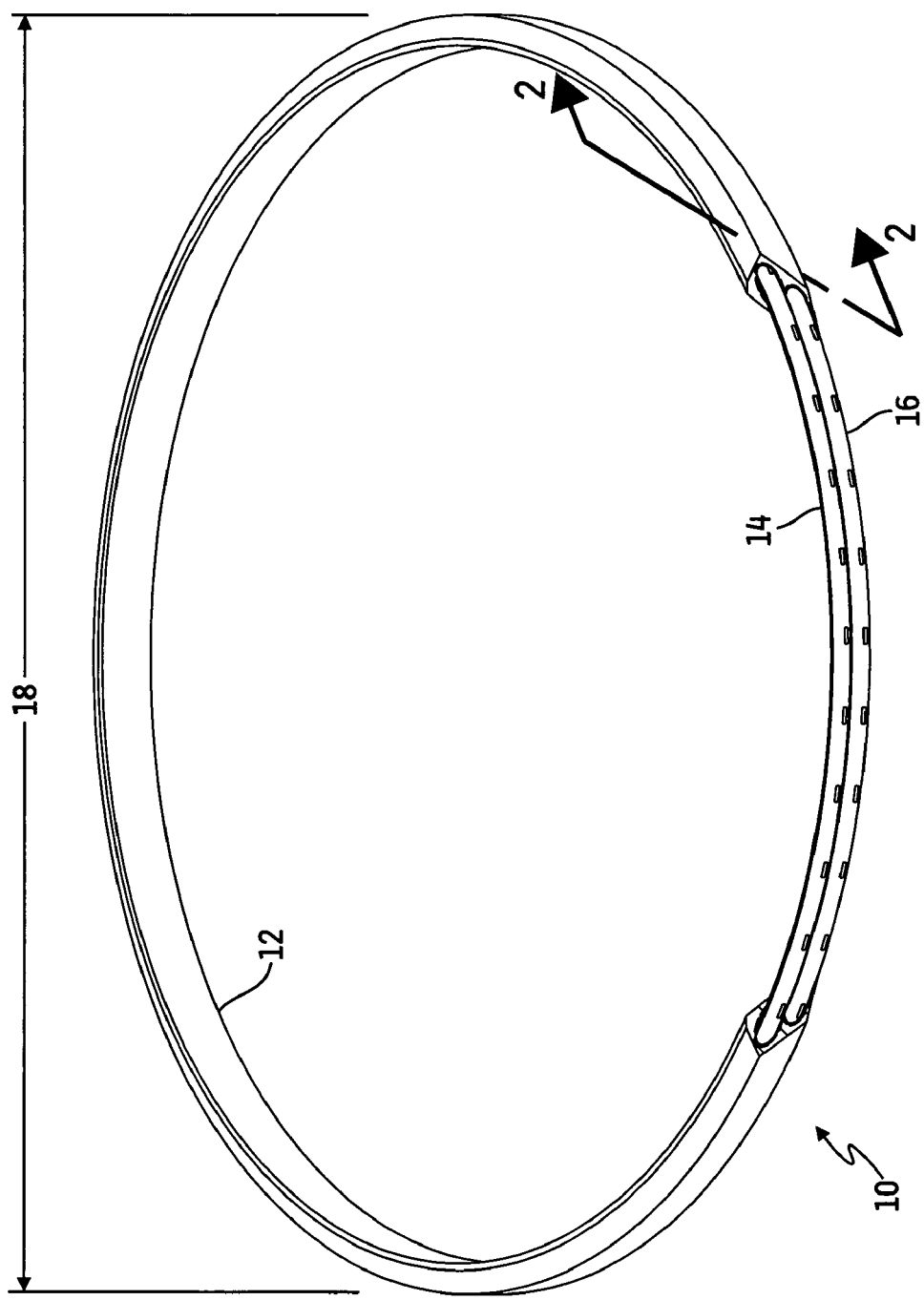
FIG. 1 is a perspective view of one embodiment of an apparatus for providing electrical power having a housing guideway with portions cut-away to illustrate two toroidal rings positioned therein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIG. 1, an apparatus 10 for providing electrical power to and/or stabilizing a vehicle, such as an aircraft, includes a housing 12 having a number of toroidal cavities defined therein. Illustratively, the housing 12 includes two toroidal cavities vertically aligned over each other. A first toroidal ring 14 is positioned in one of the toroidal guideway cavities and a second toroidal ring 16 is positioned in the other toroidal cavity. The toroidal rings 14, 16 are illustratively made from a carbon fiber composite material. However, other materials capable of withstanding the centrifugal forces developed while the toroidal rings are rotating may be used. The toroidal rings 14, 16 may be of any size and have a diameter 18 and a cross-section diameter 20 (see FIG. 2) of any length. The length of the diameter 18 and the cross-section diameter 20 of the toroidal rings 14, 16 are dependent upon the particular application. In some embodiments, the diameter 18 of the toroidal rings 14, 16 may have a length from about 3 feet to about 50 feet and the cross-section diameter 20 may have a length from about 1 inch to about 6 inches. For example, in one particular embodiment, the toroidal rings 14, 16 have a diameter 18 of about 28 feet and a cross-section diameter 20 of about three inches. Accordingly, the dimensions, including mass, of the toroidal rings 14, 16 may be determined based upon the particular application of the apparatus 10. For example, the overall mass of the toroidal rings 14, 16 may be chosen such that the rings 14, 16 provide a sufficient stabilizing effect and/or kinetic energy for the vehicle while the rings are rotating.

Although the apparatus 10 is illustrated in FIG. 1 as having two toroidal rings 14, 16 positioned in two toroidal guideway cavities of the housing 12, in other embodiments, the apparatus 10 may include any number of toroidal rings positioned in a respective number of toroidal cavities of the housing 12. In addition, although the housing 12 illustrated in FIG. 1 is a toroidal housing, in other embodiments, the housing 12 may have any type of cross-sectional shape, such as cubic, rectangular, elliptical, or the like, that is capable of including at least one toroidal cavity therein.

Figure 2:
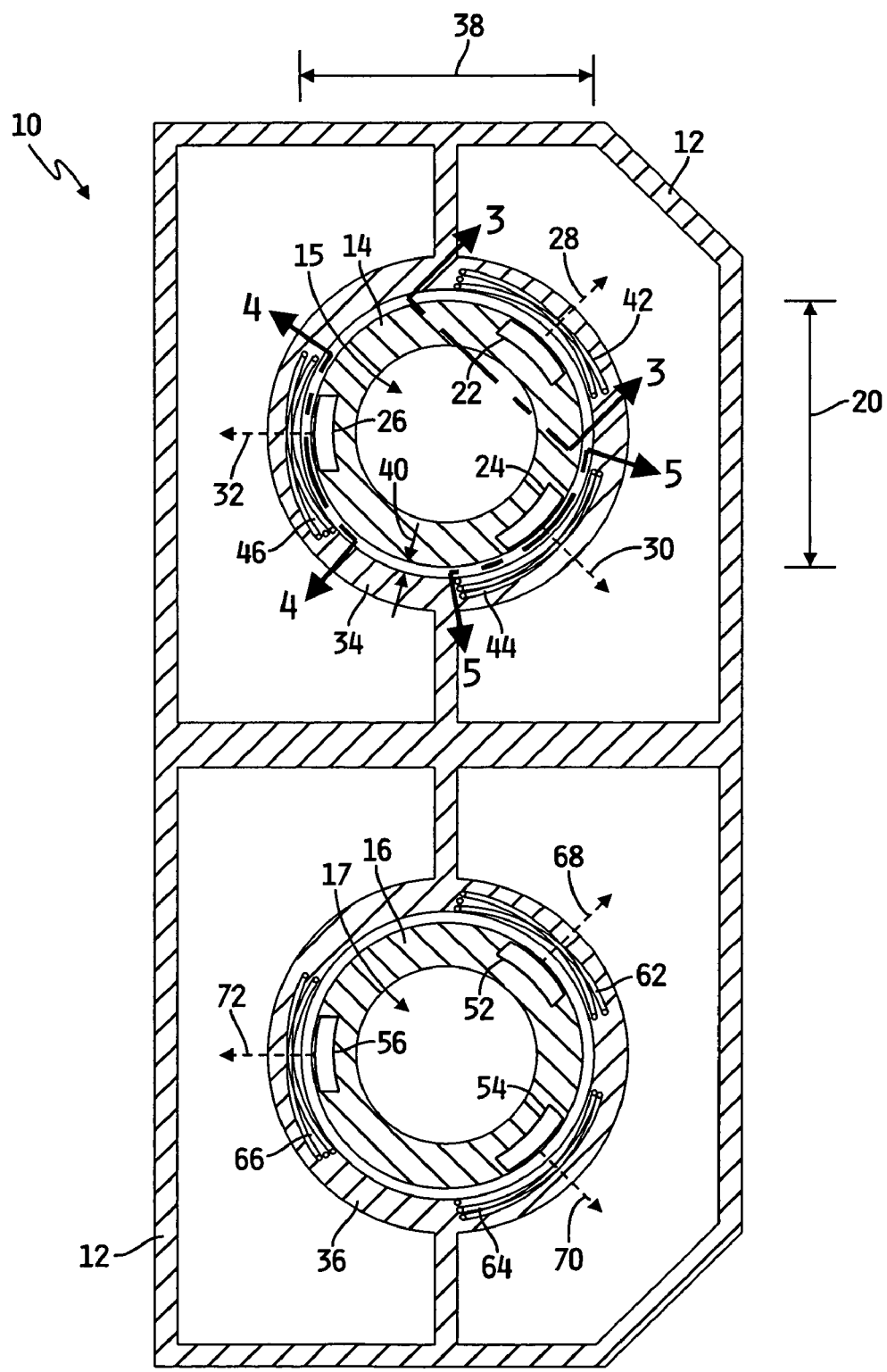
FIG. 2 is a cross-sectional view, taken generally along section lines 2-2 of FIG. 1, of one embodiment of the housing guideway and the toroidal rings of FIG. 1.

Referring now to FIG. 2, the housing 12 is formed with an open frame structure that includes toroidal casings or guideways 34, 36, which define the toroidal cavities in which the toroidal rings 14, 16 are positioned, respectively. However, in other embodiments, the housing 12 may be formed with a solid frame structure. Each of the toroidal guideways 34, 36 are depressurized to form a vacuum in each of the respective cavities. The toroidal guideways 34, 36 have an inner diameter 38 larger than the cross-section diameter 20 of the toroidal rings 14, 16 such that a small vacuum gap having a thickness 40 is formed around the toroidal rings 14, 16 when the rings are magnetically levitated, as discussed in more detail below.

In the embodiment of FIG. 2, the toroidal rings 14, 16 include internal toroidal cavities 15, 17, respectively. The internal toroidal cavities 15, 17 may be hollow or may be filled with a foam material or the like. Alternatively, in embodiments wherein additional toroidal ring mass is desirable (e.g., in embodiments wherein the diameter 18 of the toroidal rings is relatively small), the toroidal rings 14, 16 may have a smaller internal toroidal cavities 15, 17 or may be solid.

Figure 3:
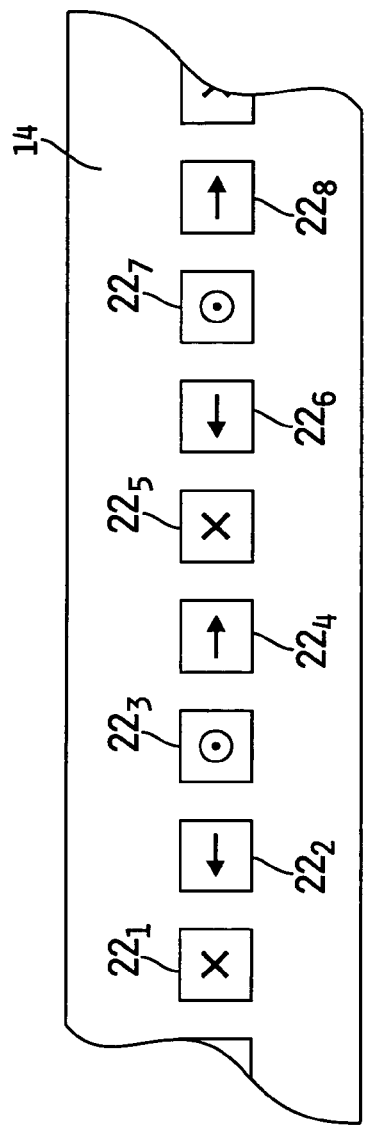
FIG. 3 is a fragmentary sectional view, taken generally along section lines 3-3 of FIG. 2, of one of the toroidal rings of FIG. 1 having a number of permanent magnets positioned in a Halbach array.

A magnetic material is coupled with each of the toroidal rings 14, 16. In the embodiment illustrated in FIG. 2, the magnetic material is embodied as a number of permanent magnets 22, 24, 26, 52, 54, 56. The permanent magnets 22, 24, 26 are embedded in rows about the outer surface of the toroidal ring 14 (i.e., a row of permanent magnets 22, a row of permanent magnets 24, and a row of permanent magnets 26). Each of the permanent magnets 22, 24, 26 is positioned in respective rows such that the magnetic fields produced by the magnets 22, 24, 26 are enhanced or augmented in an outward direction from the toroidal ring 14, as indicated by direction arrows 28, 30, 32, respectively, and reduced or substantially canceled in an inward direction toward the ring 14. Similarly, the permanent magnets 52, 54, 56 are embedded in rows about the outer surface of the toroidal ring 16. The permanent magnets 52, 54, 56 are also positioned such that the magnetic fields produced by the magnets 52, 54, 56 are enhanced or augmented in an outward direction from the toroidal ring 16, as indicated by direction arrows 68, 70, 72, respectively, and reduced or substantially canceled in an inward direction toward the ring 16. To do so, in one embodiment, the permanent magnets 22, 24, 26, 52, 54, 56 are positioned in Halbach arrays. For example, the permanent magnet 22 is formed from a row of individual permanent magnets, $22_1$-$22_n$, positioned in a Halbach array such that the pole of each individual permanent magnet, $22_1$-$22_n$, is oriented as illustrated in FIG. 3.

The permanent magnets 22, 24, 26, 52, 54, 56 are illustratively formed from rare earth alloys. In one particular embodiment, the magnets 22, 24, 26, 52, 54, 56 are formed from a lanthanide alloy such as, for example, a neodymium-iron boron (NdFeB) alloy or a samarium cobalt (SmCo) alloy. However, in other embodiments, other materials may be used based on such criteria as, for example, the magnetic intensity of the material, the thermal characteristics of the material, and the like. Although in the illustrative embodiment of FIG. 2 the magnetic material is embodied as permanent magnets, in other embodiments, the magnetic material may be embodied as magnetic powder that is adhered to the outer surface of or embedded into the toroidal rings 14, 16. In such embodiments, the magnetic powder may be adhered, embedded, or otherwise positioned in a Halbach array. For example, the magnetic powder may be included in the material of the toroidal rings as the rings are manufactured, and subsequently aligned in a Halbach array, or an approximate Halbach array, as the rings are formed.

The apparatus 10 also includes a number of windings 42, 44, 46 and 62, 64, 66 coupled with the toroidal guideways 34, 36, respectively. As used herein, the term "winding" is intended to refer to any one or more coils having any number of turns each. For example, a winding may be embodied as multiple coils electrically coupled to each other and having a fixed number of turns each. Alternatively, a winding may also be embodied as a single coil having a single turn which, in some embodiments may be short circuited (i.e., have electrically coupled ends). Additionally, a winding may be embodied as a number of sets of coils having any number of turns each such that the winding is usable with a multi-phase power signal (i.e., the winding is a multi-phase winding). As such, a winding may be "active" and configured as an electromagnet to generate a magnetic field in response to an energizing power signal. Alternatively, a winding may be "passive" and generate a magnetic field in response to an induced current. A winding may be formed from any type of wire, laminated material, or other material capable of providing a current path.

In the embodiment illustrated in FIG. 2, the windings 42, 44, 46 and 62, 64, 66 are embedded within the toroidal guideways 34, 36, respectively. However, in other embodiments, the windings 42, 44, 46, 62, 64, 66 may be coupled to the interior or exterior walls of the toroidal guideways 34, 36. Illustratively, the windings 42, 44, 46, 62, 64, 66 are super conducting and are formed from a number of individual coils of super conducting wire. For example, in one particular embodiment, the super conducting wire is formed from a niobium alloy such as niobium titanium (NbTi) or niobium tin ($NB_3Sn$). The windings 42, 44, 46, 62, 64, 66 may be formed with any number of individual coils having any number of turns each. For example, and without limitation, one or more of the windings 42, 44, 46, 62, 64, 66 may be formed from super conducting coils having about 550 turns that can support up to four amps of current (i.e., superconducting coils having about 2,200 Ampere-turns per coil). In addition, in some embodiments, one or more of the windings 42, 44, 46, 62, 64, 66 (e.g., windings used as electromagnets) may be formed from square super conducting cable in conduit (CIC) to facilitate cryogenic cooling of the electromagnets using a cooling system as discussed below in regard to FIG. 8.

Figure 4:
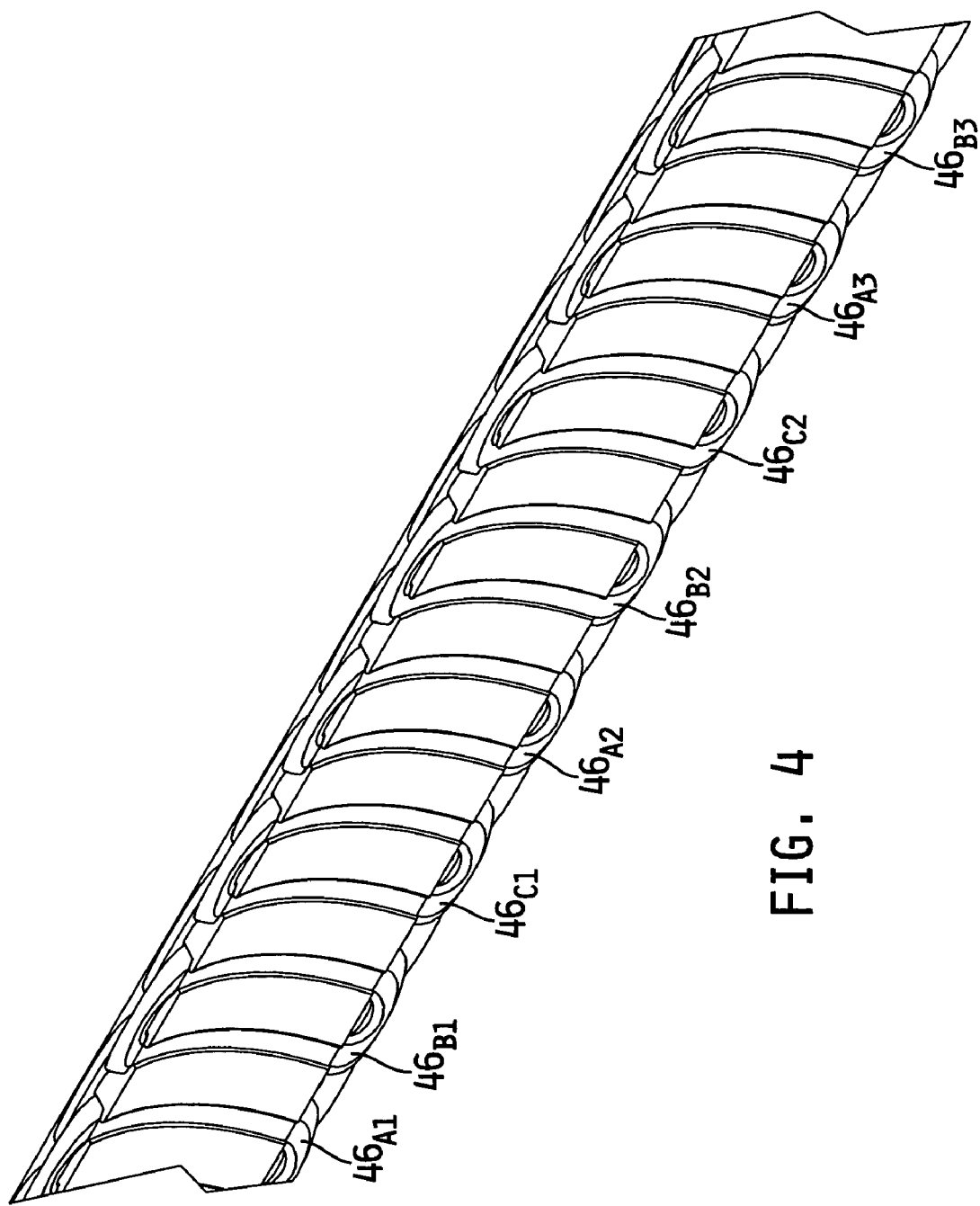
FIG. 4 is a fragmentary sectional view, taken generally along section lines 4-4 of FIG. 2, of a portion of the propulsion windings coupled with the housing of FIG. 1.

In the illustrative embodiment of FIG. 2, the windings 46 and 66 are propulsion/generator windings and cooperate with the permanent magnets 26, 56 to rotate the toroidal rings 14, 16, respectively, and to generate an amount of power. The illustrative propulsion windings 46, 66 may be single or multiple phase windings depending upon the application. For example, as illustrated in FIG. 4 in regard to winding 46, the propulsion winding 46 may include a first set (i.e., a first phase) of propulsion coils $46_{A1-An}$, a second set (i.e., a second phase) of propulsion coils $46_{B1-Bn}$, and a third set (i.e., a third phase) of propulsion windings $46_{C1-Cn}$. For space efficiency, the individual coils $46_{A1-An}$, $46_{B1-Bn}$, and $46_{C1-Cn}$ of the winding 46 (and coils of the winding 66) may be positioned in overlapping positions as illustrated in FIG. 4.

Each of the propulsion coils $46_{A1-An}$, $46_{B1-Bn}$, and $46_{C1-Cn}$ may be controlled by a control system, as discussed further below in regard to FIG. 8, to generate a rotational force on the toroidal rings 14, 16. To do so, a power signal (e.g. an alternating current, three phase signal) is supplied to the propulsion windings 46, 66. While receiving the power signal, the propulsion windings 46, 66 form electromagnets that generate alternating magnetic fields. Some of the individual coils (i.e., electromagnets) of the propulsion windings 46, 66 are energized fully while other individual coils are only energized partially or not at all. The alternating magnetic fields interact with the respective magnetic fields generated by the permanent magnets 26, 56 to "push and pull" the toroidal rings 14, 16 via magnetic repulsion and magnetic attraction. While the propulsion windings 46, 66 are energized by the power signal, the propulsion windings 46, 66 and permanent magnets 26, 56 form a motor. Once the rings 14, 16 are rotating at an operational speed, the toroidal rings 14, 16 may provide a stabilizing effect and/or be used as a power source. For example, once the rings 14, 16 are rotating, the power signal may be removed from the propulsion windings and, in response, the propulsion windings 46, 66 no longer act as electromagnets. Rather, the propulsion windings 46, 66 and permanent magnets 26, 56 cooperate to form an electric generator while the toroidal rings 14, 16 are rotating. That is, as the magnetic fields generated by the permanent magnets 26, 56 pass across the individual coils of the propulsion windings 46, 66, respectively, a current is induced in the electromagnets 46, 66. In this way, electromagnets 46, 66 and the permanent magnets 26, 56 cooperate to generate electrical power while the toroidal rings 14, 16 are rotating. The generated electrical power may be used to power the vehicle (e.g., an electric motor of the vehicle) and/or other electrical devices including, in some embodiments, the windings 42, 44, 46, 62, 64, 66, as discussed below.

The windings 42, 44, and 62, 64 are levitation windings and, in operation, are used to levitate the toroidal rings 14, 16. In some embodiments, the levitation windings 42, 44, 62, 64 may be inductive guides that provide levitation based on induced currents that are induced while the toroidal rings 14, 16 (i.e., while the permanent magnets 22, 24, 52, 54) are in motion. In such embodiments, the levitation windings 42, 44, 62, 64 are passive. That is, as the magnetic fields generated by the permanent magnets 22, 24, 52, 54 pass across the levitation windings 42, 44, 62, 64, a current is induced in the windings 42, 44, 62, 64 that creates a repulsive magnetic field. The magnetic field generated by the windings 42, 44, 63, 64 repulses the magnetic field generated by the permanent magnets 22, 24, 52, 54, which levitates the toroidal rings 14, 16 via the magnetic repulsion force. In some embodiments, the passive levitation windings 42, 44, 62, 64 may be formed from laminated sections of conductive material or Litz wire. In such embodiments, the windings 42, 44, 62, 64 are formed from a number of single turn coils having short-circuited ends that allow the induced currents to efficiently create an opposing magnetic field to levitate the rings 14, 16. For example, in such a passive levitation embodiment, the levitation winding 44 may be formed from a laminated section of conductive material having a series of slots or openings 49 as illustratively shown in FIG. 5. A single turn coil $47_{1-n}$ is formed around each slot 49. As the magnetic field generated by the permanent magnets 24 passes across the levitation winding 44, a current is induced in each of the coils $47_{1-n}$ which generates a repulsive magnetic field, as discussed above. The other levitation windings 42, 62, 64 are similarly constructed in such an embodiment.

In other embodiments, the windings 42, 44, 62, 64 are "active" and are configured as electromagnets. In use, the levitation windings 42, 44, 62, 64 cooperate with the permanent magnets 22, 24, 52, 54, respectively, to levitate the toroidal rings 14, 16. To do so, a power signal, or energizing current signal, is supplied to the levitation windings 42, 44, 62, 64. In response, the levitation windings 42, 44, 62, 64 generate magnetic fields. The magnetic fields generated by the levitation windings 42, 44, 62, 64 attracts the magnetic fields generated by the permanent magnets 22, 24, 52, 54, respectively. The toroidal rings 14, 16 are levitated by the attraction of the associated magnetic fields. In such embodiments, the levitation windings 42, 44, 62, 64 are similar to the propulsion windings 46, 66 (e.g., single phase propulsion windings 46, 66) and are formed from a number of individual levitation coils (i.e., electromagnets) having any number of turns as discussed above in regard to FIG. 2. Further, in some embodiments the levitation windings 42, 44, 62, 64 may include both "passive" and "active" windings such that a portion of the windings 42, 44, 62, 64 generate a levitating magnetic field in response to an applied power single while another portion of the windings 42, 44, 62, 64 generate a levitating magnetic field in response to an induced current, as discussed above. Yet further, in some embodiments, propulsion windings may be interleaved or otherwise included with the levitation windings 42, 44, 62, 64.

Figure 6:
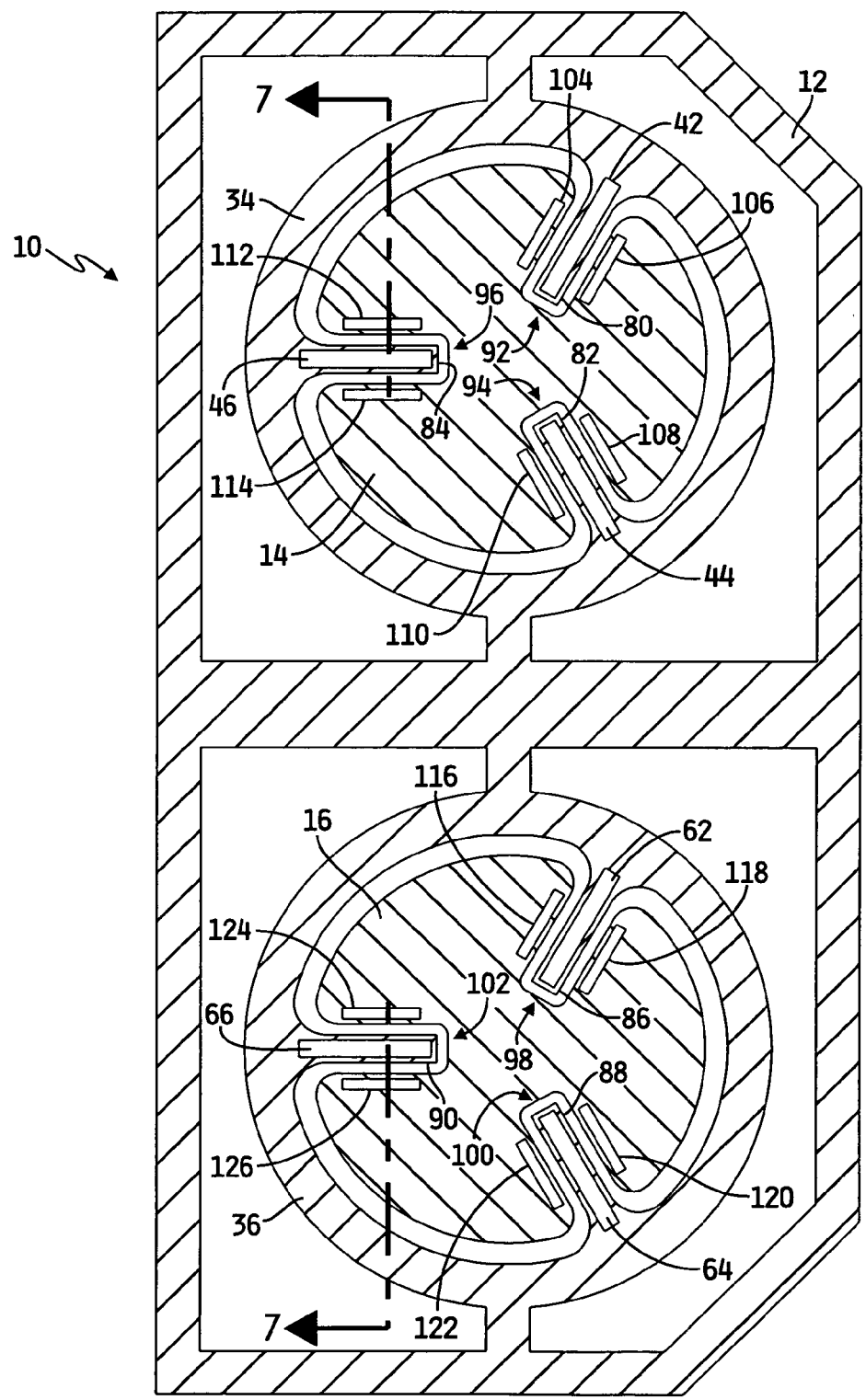
FIG. 6 is a cross-sectional view similar to FIG. 2 of another embodiment of the housing guideway and toroidal rings of FIG. 1.

Referring now to FIG. 6, in another embodiment, the toroidal guideway 34 includes protrusions 80, 82, 84 and the toroidal guideway 36 includes protrusions 86, 88, 90. The toroidal ring 14 includes a notch 92 configured to receive the protrusion 80, a notch 94 configured to receive the protrusion 82, and a notch 96 configured to receive the protrusion 84. Similarly, the toroidal ring 16 includes a notch 98 configured to receive the protrusion 86, a notch 100 configured to receive the protrusion 88, and a notch 102 configured to receive the protrusion 90. Although the illustrative embodiment of FIG. 6 includes two toroidal rings 14, 16 and guideways 34, 36, any number of toroidal rings and associated guideways may be included in other embodiments.

In the embodiment of FIG. 6, the toroidal ring 14 includes permanent magnets 104, 106 instead of the permanent magnets 22, permanent magnets 108, 110 instead of permanent magnets 24, and permanent magnets 112, 114 instead of permanent magnets 26. However, the permanent magnets 104, 106, 108, 110, 112, 114 are similar to the permanent magnets 22, 24, 26. Each of the permanent magnets 104, 106, 108, 110, 112, 114 is formed from a number of individual permanent magnets embedded in a row around the toroidal ring 14. Similar to toroidal ring 14, the toroidal ring 16 includes permanent magnets 116, 118 instead of the permanent magnets 52, permanent magnets 120, 122 instead of permanent magnets 54, and permanent magnets 124, 126 instead of permanent magnets 56. The permanent magnets 116, 118, 120, 122, 124, 126 are similar to the permanent magnets 52, 54, 56 and are each formed from number of individual permanent magnets embedded in a row around the toroidal ring 16.

Figure 7:
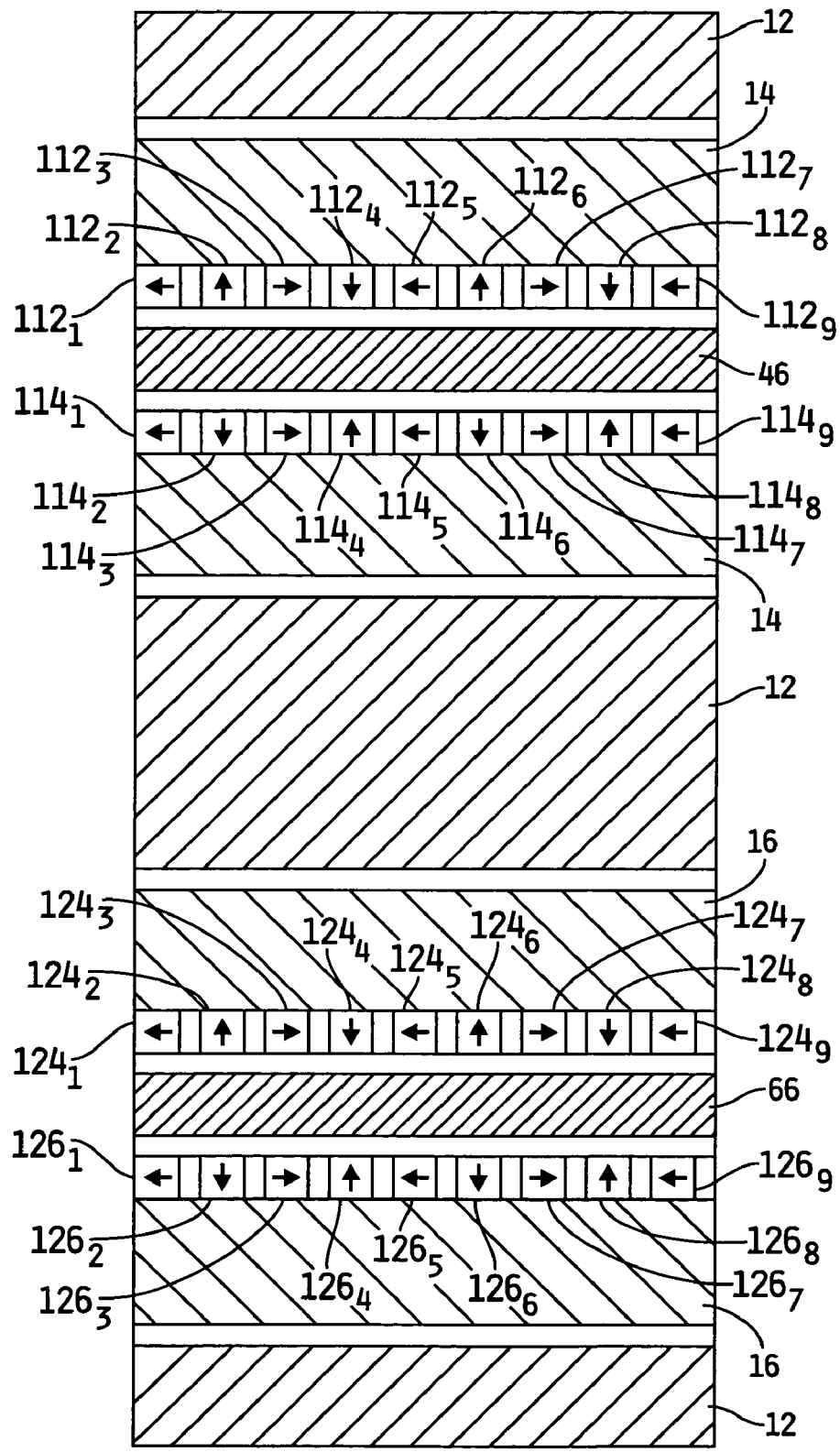
FIG. 7 is a fragmentary cross-sectional view, taken generally along sections lines 7-7, of the housing and toroidal rings of FIG. 6.

Each of the permanent magnets 104, 106, 108, 110, 112, 114, 116, 118, 120, 122, 124, 126 are positioned in Halbach arrays. For example, as illustrated in FIG. 7, the permanent magnets 112 and 114 are formed from a number of individual permanent magnets, $112_1$-$112_n$ and $114_1$-$114_n$, positioned in Halbach arrays such that the magnetic field generated by the magnets $112_1$-$112_n$ and $114_1$-$114_n$ is enhanced or augmented in the region of the notch 84 and reduced outside of this region. Similarly, the permanent magnets 124 and 126 are formed from a number of individual permanent magnets, $124_1$-$124_n$ and $126_1$-$126_n$, positioned in Halbach arrays such that the magnetic field generated by the magnets $124_1$-$124_n$ and $126_1$-$126_n$ is enhanced or augmented in the region of the notch 102 and reduced outside of this region.

Figure 5:
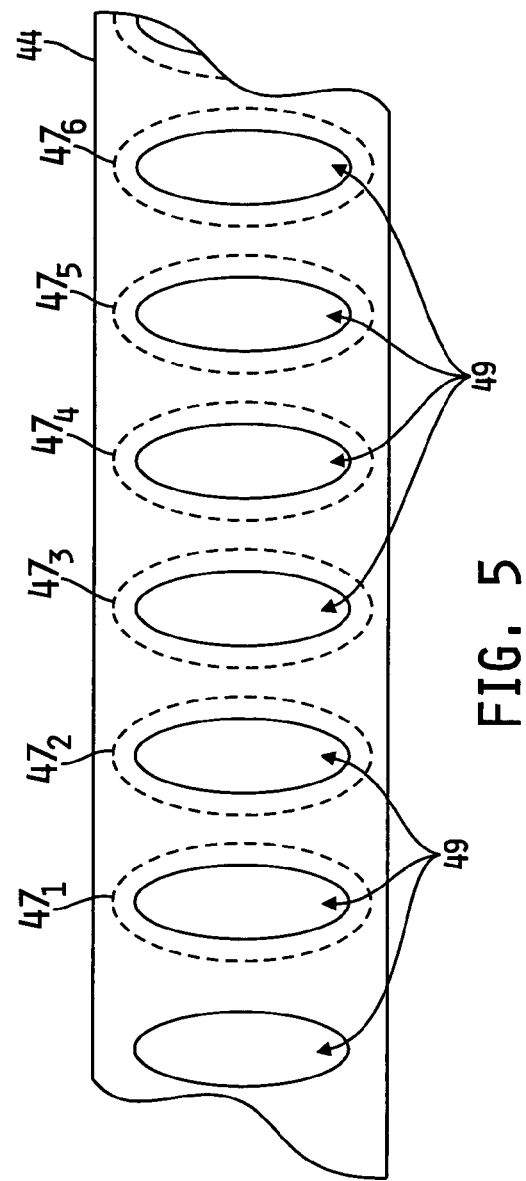
FIG. 5 is a fragmentary section view, taken generally along section lines 5-5 of FIG. 2, of one embodiment of the levitation windings of the apparatus of FIG. 1.

The levitation windings 42 and 44 are positioned in the protrusions 80 and 82 respectively. Similarly, the levitation windings 62 and 64 are positioned in the protrusions 86 and 88, respectively. The levitation windings 42, 44, 62, 64 operate in substantially the same manner as described above in regard to FIGS. 2 and 5. That is, the levitation windings 42, 44, 62, 64 may be "passive" and formed from a number of individual coils having a single, short-circuited turn (e.g., a laminated conductive material having a number of slots as illustrated in FIG. 5). Alternatively, the levitation windings 42, 44, 62, 64 may be "active" and formed from a number of individual coils that operate as electromagnets to generate an attractive, levitating magnetic field.

The propulsion windings 46 and 66 are embedded within the protrusions 84 and 90, respectively. The propulsion windings 46, 66 operate in substantially the same manner as described above in regard to FIGS. 2 and 4. That is, the propulsion windings 46, 66 are formed from a number of individual coils that operate as electromagnets to generate a propulsion magnetic field. To do so, a power signal (e.g., an alternating current, three phase signal) is supplied to the propulsion windings 46, 66 to cause the windings 46, 66 to generate alternating magnetic fields. The alternating magnetic fields interact with the respective magnetic fields generated by the permanent magnets 112, 114, 124, 126 to "push and pull" the toroidal rings 14, 16 via magnetic repulsion and magnetic attraction. Once the rings 14, 16 are moving (i.e., rotating) the power signal may be removed and the propulsion windings 46, 66 and permanent magnets 112, 114, 124, 126 cooperate to form an electric generator. That is, as the magnetic fields generated by the permanent magnets 112, 114, 124, 126 pass across the individual coils of the propulsion windings 46, 66, a current is induced in the coils. In this way, windings 46, 66 and the permanent magnets 112, 114, 124, 126 cooperate to generate electrical power while the toroidal rings 14, 16 are rotating. Additionally, while rotating, the toroidal rings 14, 16 may provide a stabilizing effect to a vehicle with which the apparatus 10 is included. For example, depending upon the implementation, the toroidal rings 14, 16 may provide a yaw, pitch, and/or roll stabilizing effect while rotating.

Although the propulsion windings 46, 66 and levitation windings 42, 44, 62, 64 are illustrated in FIG. 6 as located remotely from each other, it should be appreciated that, in some embodiments, the propulsion windings 46, 66 may also be interleaved with levitation windings 42, 44, 62, 64 in the protrusions 80, 82, 86, 88 and interact with the permanent magnets 104, 106, 108, 110, 116, 118, 120, 122. Similarly, in some embodiments, the levitation windings 42, 44, 62, 64 may also be interleaved with the propulsion windings 46, 66 and interact with the permanent magnets 112, 114, 124, 126.

Figure 8:
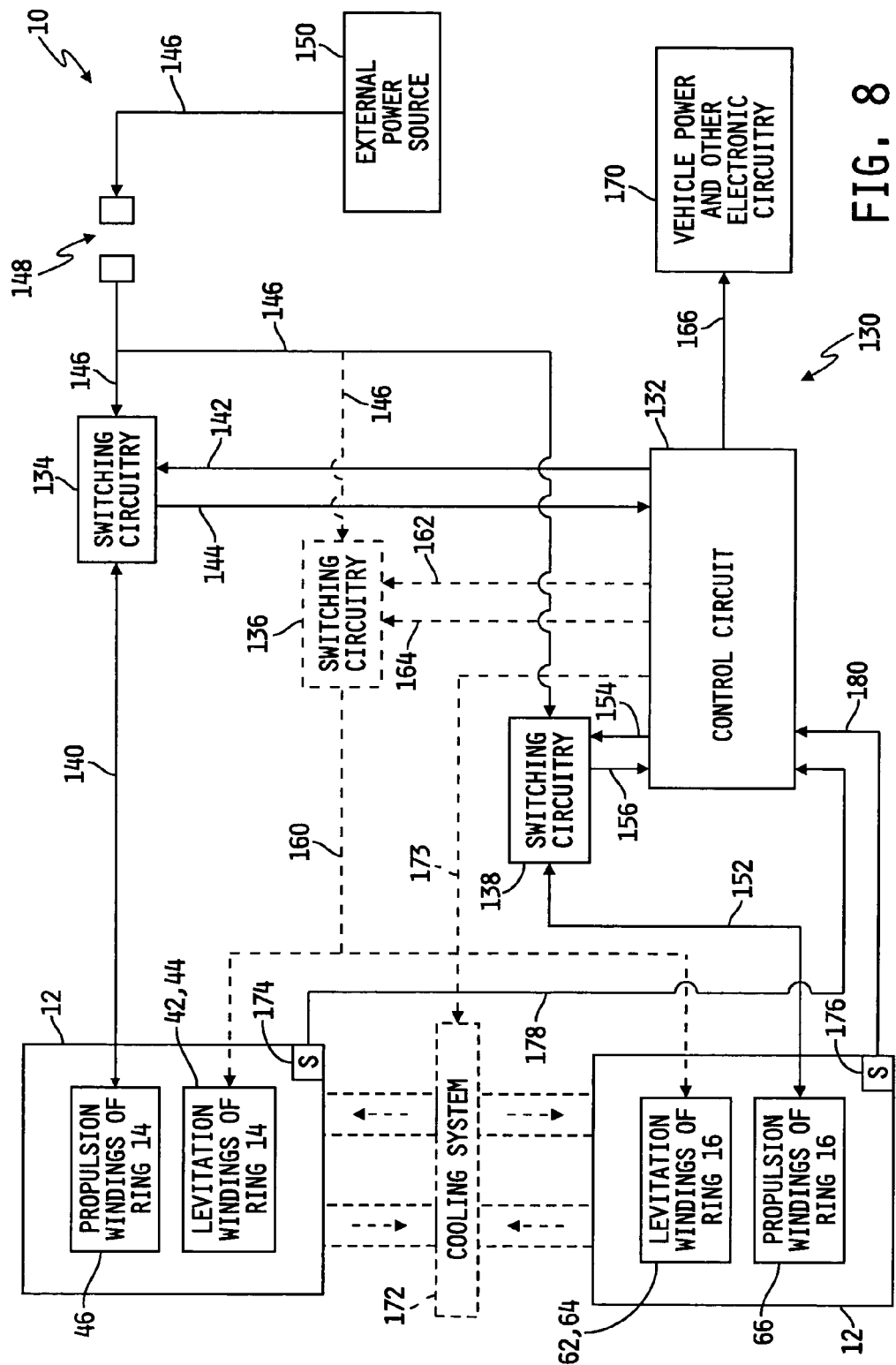
FIG. 8 is another embodiment of the apparatus of FIG. 1 including a control system for providing electrical power.

Referring now to FIG. 8, in some embodiments, apparatus 10 may also include a control system 130 coupled to the windings 42, 44, 46, 62, 64, 66 embedded or otherwise coupled with the housing 12. The control system 130 includes a control circuit 132 and switching circuitry 134, 138 and, in some embodiments, switching circuitry 136. The control circuit 132 may be embodied as any type of control circuit such as a microprocessor, microcontroller, application specific integrated circuit (ASIC), discrete components, or the like.

Additionally, the control circuit 132 may include other circuitry for controlling or interacting with the other components of the control system 130 including, but not limited to, memory devices, processors, output drivers, relays, switches, buffers, power conversion circuitry, etc. The switching circuitry 134, 136, 138 may be embodied as any type circuitry capable of selectively coupling various interconnects. For example, in some embodiments, the switching circuitry 134, 136, 138 is embodied as a number of relays, switches, or the like. Additionally, in some embodiments, the switching circuitry 134, 136, 138, or a portion thereof, is included in the control circuit 132.

The control circuit 132 is coupled to the propulsion windings 46 of the toroidal ring 14 via the switching circuitry 134. Specifically, the switching circuitry 134 is coupled to the propulsion windings 46 via a number of interconnects 140. The control circuit 132 is coupled to the switching circuitry 134 via a number of interconnects 142 and interconnects 144. The switching circuitry 134 may also be removably coupled to an external power source 150 via a number of interconnects 146 and a connector 148. Similarly, the control circuit 132 is coupled to the propulsion windings 66 of the toroidal ring 16 via the switching circuitry 138. Specifically, the switching circuitry 138 is coupled to the propulsion windings 66 via a number of interconnects 152. The control circuit 132 is coupled to the switching circuitry 138 via a number of interconnects 154 and interconnects 156. Similar to the switching circuitry 134, the switching circuitry 138 may also be removably coupled to the external power source 150 via the interconnects 146 and the connector 148. The external power source 150 may be any type of power source external to the apparatus 10. In some embodiments, the external power source 150 is embodied as a battery or battery pack. In other embodiments, the external power source 150 may be embodied as an electrical generator, capacitor bank, or electrical grid. Regardless, the external power source 150 is a power source capable of providing enough power for the propulsion windings 46, 66 to generate an alternating magnetic field sufficient to cause the toroidal rings 14, 16 to rotate to the minimum operating rotational speed (e.g., 45,000 RPM).

In embodiments wherein the levitation windings are "active" (i.e., configured as electromagnets), the control circuit 132 is also coupled to the levitation windings 42, 44 of the toroidal ring 14 and the levitation windings 62, 64 of the toroidal ring 16 via the switching circuitry 136. Specifically, the switching circuitry 136 is coupled to the levitation windings 42, 44, 62, 64 via a number of interconnects 160. The control circuit 132 is coupled to the switching circuitry 136 via a number of interconnects 162 and interconnects 164. The switching circuitry 136 may also be removably coupled to the external power source 150 via the interconnects 146 and the connector 148.

The control circuit 132 is also coupled to sensors 174, 176 via a number of interconnects 178, 180, respectively. The sensor 174 is coupled with the toroidal guideway 34 and positioned to detect or determine the rotational speed of the toroidal ring 14. Similarly, the sensor 176 is coupled with the toroidal guideway 36 and positioned to detect or determine the rotational speed of the toroidal ring 16. As such, the sensors 174, 176 produce a signal indicative of the respective rotational speeds. The sensors may be any type of sensors capable of detecting or determining the rotational speed of the toroidal rings 14, 16 such as, for example, hall effect sensors, infrared sensors, laser sensors, or the like. In some embodiments, additional sensors may be used to detect other conditions of the toroidal rings 14, 16 such as, for example, the alignment of the rings relative to the guideways 34, 36. Such additional sensors may also be any type of sensor capable of detecting the desired condition.

The control circuit 132 is also coupled to the vehicle power and other electronic circuitry 170 via a number of interconnects 166. Such vehicle power circuitry may include, for example, electrical motors or other electrical vehicle propulsion devices for moving the vehicle. Such other electronic circuitry may include any additional circuitry capable of receiving power from the control circuitry. For example, the other electronic circuitry 170 may include electronic instruments such as flight navigation instruments, computers, environment conditioners, communication devices, and the like.

In some embodiments, the apparatus 10 may also include a cooling system 172. In such embodiments, the control circuit 132 is coupled to the cooling system 172 via a number of interconnects 173. The cooling system 172 is illustratively an open-ended cooling system (i.e., the cooling medium is not locally re-cooled). As such, external cooling of the cooling medium (e.g., cooling fluid) may be performed. Additionally, in some embodiments, the cooling medium may be released rather than captured such as, for example, those embodiments wherein liquid nitrogen is used as the cooling medium. Alternatively, the cooling system 172 may be a closed-ended cooling system wherein the cooling medium is re-cooled after each use. In such embodiments, the cooling system 172 may include a refrigerator or other cooling means to cool the cooling medium. In such embodiments, the cooling medium may flow in contact with or in proximity to one or more of the windings 42, 44, 46, 62, 64, 66 to remove heat in the windings and, thereby, reduce the resistance of the wires forming the windings 42, 44, 46, 62, 64, 66. Reduction of the resistance of the windings 42, 44, 46, 62, 64, 66 may improve the overall efficiency of the apparatus 10. In this way, the wires forming the windings 42, 44, 46, 62, 64, 66 are cooled by the cooling medium. The cooling medium may be collected in a storage reservoir (not shown) and may be externally or internally cooled depending on the type of cooling system used.

In use, the control circuit 132 is configured to control the operation of the switching circuitry 134, 136, 138 and to control the distribution of the electrical power generated by the toroidal rings 14, 16 (while rotating). For example, prior to use of the apparatus 10, the toroidal rings 14, 16 may be stationary or otherwise not rotating. Because the rings 14, 16 are not rotating, the toroidal rings 14, 16 are not generating any appreciable electrical power. Accordingly, the external power source 150 may be coupled to the apparatus 10 to provide power to the apparatus 10. To do so, the control circuit 132 transmits a control signal to the switching circuit 134 via interconnects 142 to cause the switching circuit 134 to couple the interconnect 140 with the interconnect 146. The control circuitry 132 also transmits a control signal to the switching circuit 138 via interconnect 154 to cause the switching circuit 136 to couple the interconnect 152 with the interconnect 146. Additionally, in embodiments wherein the levitation windings 42, 44, 62, 64 are "active" (i.e., configured as electromagnets), the control circuit 132 transmits a control signal to the switching circuit 136 via interconnect 162 to cause the switching circuit 136 to couple the interconnect 160 with the interconnect 146. In this way, the external power source 150 provides power to the interconnects 160, which energizes the levitation windings 42, 44, 62, 64. As discussed above, the apparatus 10 may include additional sensors to detect the alignment of the toroidal rings 14, 16 in the guideways 34, 36 in relation to the levitation windings 42, 44, 62, 64. Based on feedback from the alignment sensors, the control circuit 132 may be configured to adjust the signal (e.g., adjust the voltage of the signal) applied to the levitation windings 42, 44, 62, 64 to maintain proper alignment of the rings 14, 16 in the guideways 34, 36.

The external power source 150 also provides power to the interconnects 140 and 152, which energizes the propulsion windings 46, 66. However, the switching circuitry 134, 136 and/or the control circuit 132 may also modify, convert, or modulate the power provided by the external power source 150 and to the propulsion windings 46, 66. For example, the power signal provided by the external power source 150 may be converted to a three-phase power signal and supplied to the three-phase coils of the propulsion windings 46, 66, as discussed above in regard to FIG. 4. Additionally, in some embodiments, the power signal provided by the external power source 150 may be converted from a direct current power signal to an alternating current power signal. Regardless, once energized, the propulsion windings 46, 66 generate an alternating magnetic field in the toroidal cavities defined by the toroidal guideways 34, 36. The alternating magnetic fields cause the toroidal rings 14, 16 to rotate via magnetic repulsion and attraction. In this way, the toroidal rings 14, 16 are "pushed and pulled" by the alternating magnet field. The rotational speed of the toroidal rings 14, 16 is determined by the sensors 174, 176 and data signals indicative thereof are transmitted by each sensor 174, 176 to the control circuit 132 via the interconnects 178, 180, respectively. The control circuit 132 is configured to monitor the rotational speed of each toroidal ring 14, 16 to ensure the rings 14, 16 are rotating in counter or opposite directions at the necessary speeds to produce the desired net angular momentum. As discussed above, the toroidal rings 14, 16 may be rotated in opposite directions at approximately the same speed to generate a minimal net angular momentum. Alternatively or additionally, the toroidal rings 14, 16 may be rotated in the same direction or in opposite directions but at different speeds to provide a stabilizing effect to the aircraft. Regardless, the control circuit 132 may control the rotational speed of the rings 14, 16 by controlling the voltage supplied to the propulsion windings 46, 66. The control circuit 132 controls the voltage by, for example, controlling the switching circuitry 134, 138.

Once the control circuit 132 determines that both toroidal rings 14, 16 are rotating at a speed equal to or greater than a predetermined operational rotational speed, the control circuit is configured to control the switching circuitry 134, 136, and 138 to disconnect the apparatus 10 from the external power source 150. That is, the control circuit 132 transmits a control signal to the switching circuit 134 via interconnects 142 to cause the switching circuit 134 to decouple the interconnect 140 from the interconnect 146 and couple the interconnect 140 with the interconnect 144. Similarly, the control circuit 132 transmits a control signal to the switching circuit 138 via interconnect 154 to cause the switching circuit 138 to decouple the interconnect 152 from the interconnect 146 and couple the interconnect 152 with the interconnect 156. Additionally, in embodiments wherein the levitation windings 42, 44, 62, 64 are configured as electromagnets, the control circuitry 132 transmits a control signal to the switching circuit 136 via interconnect 162 to cause the switching circuit 136 to decouple the interconnect 160 from the interconnect 146 and couple the interconnect 160 with the interconnect 164.

Because the toroidal ring 14 is rotating, the permanent magnets 26-(or permanent magnets 112, 114) and the propulsion windings 46 form an electrical generator and supply electrical power to the control circuit 132 via the interconnect 140, the switching circuitry 134, and the interconnect 144. Similarly, because the toroidal ring 16 is rotating, the permanent magnets 56 (or permanent magnets 124, 126) and the propulsion windings 66 form an electrical generator and supply electrical power to the control circuit 132 via the interconnect 152, the switching circuitry 138, and the interconnect 156. The control circuit 132 receives the electrical power via the interconnects 144, 156 and redistributes the power to the vehicle power and other electronic circuitry 170 via interconnects 166. The control circuit 132 is configured to monitor and control the amount of power drawn from the toroidal rings 14, 16 (via the windings 46, 66) in order to maintain the net angular momentum of the toroidal rings 14, 16 at a the desired amount.

The vehicle power and other electronic circuitry 170 may include any type of circuitry capable of being powered by the electrical power generated by the toroidal rings 14, 16. For example, the vehicle power and other electronic circuitry 170 may include electrical motors, other electrical vehicle propulsion and lift devices, electrical instruments, computers, control systems, lights and displays, electrical gauges, and the like. In one particular embodiment, the other electrical circuitry 170 includes electrical circuitry commonly found in an aircraft such as propulsion systems, communication instruments and systems, navigation instruments and systems, lighting systems, global positioning systems (GPS), multi-purpose displays (MPDs), and engine or motor monitoring systems. In embodiments wherein the levitation windings are "active" (i.e., configured as electromagnets, the control circuit 132 may also distributes electrical power to the levitation windings 42, 44, 62, 64 to maintain the levitation of the toroidal rings 14, 16, respectively, in the manner described above in regard to FIG. 2. In embodiments wherein the levitation windings are "passive", the induced current caused by magnet fields generated by the cooperation of the levitation windings 42, 44, 62, 64 and associated permanent magnets 22, 24, 52, 54 (or 104, 106; 108, 110; 116, 118; 120, 122) generates a levitational force (i.e., a magnetic repulsive force) to maintain the toroidal rings 14, 16 in the levitated position.

In some embodiments, the control circuit 132 monitors the rotational speed of the toroidal rings 14, 16 via the sensors 174, 176 and produces a warning signal to an operator of the apparatus 10 (or vehicle powered by the apparatus 10) if the rotational speed of the toroidal rings 14, 16 falls below a predetermined minimum rotation speed (e.g., 6,000 RPM). The warning signal notifies the operator that "recharging" of the toroidal rings 14, 16 (i.e., providing power to the propulsion windings 46, 66 to rotate the rings 14, 16 to the predetermined operational rotational speed using the external power source 150) is required. In such situations, the control circuit 132 may be configured to remove power from some of the vehicle power and other electronic circuitry 170 to thereby reserve power for higher priority devices such as drive motors. The toroidal rings 14, 16 may be recharged by coupling the external power source 150 to the apparatus 10 using the connector 148 in the manner described above.

Figure 9:
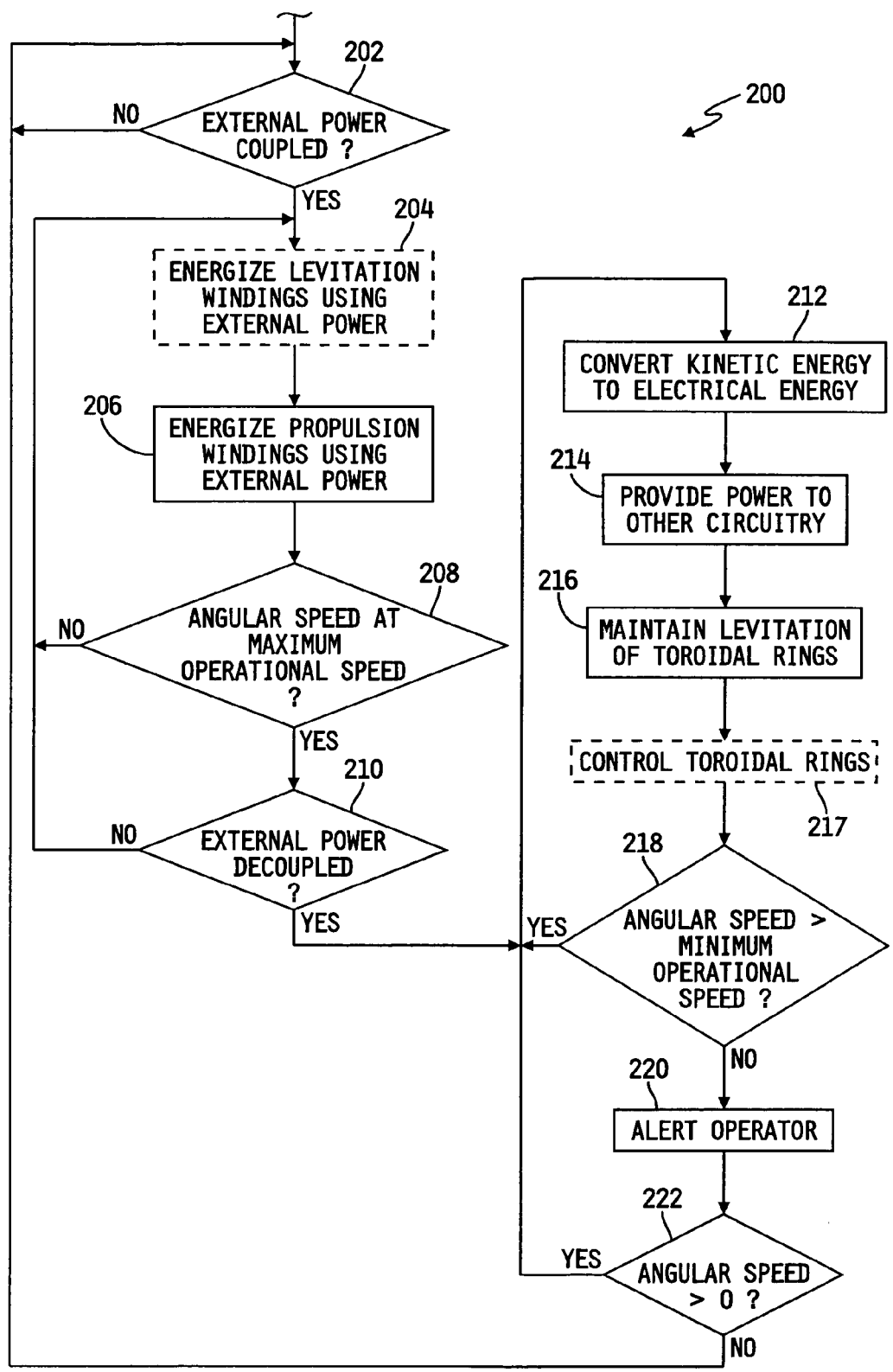
FIG. 9 is a simplified flowchart of an algorithm for providing electrical power used by the control system of FIG. 8.

Referring now to FIG. 9, an algorithm 200 for powering a vehicle, which may be executed by the control circuit 132, begins with a process step 202. Prior to process step 202, the toroidal rings 14, 16 are stationary or below the minimum rotational speed. Accordingly, the toroidal rings 14, 16 (i.e., permanent magnets 26, 56, 112, 114, 124, 126 and propulsion windings 46, 66) are generating minimal or no electrical power. In process step 202, the control circuit 132 determines if the external power source 150 is coupled to the apparatus 10. As described above in regard to FIG. 8, the external power source 150 may be coupled to the apparatus 10 via the connector 148. If the external power source 150 is not coupled to the apparatus 10, the algorithm 200 loops back to process step 202. In this way, the algorithm 200 monitors for the coupling of the external power source 150 to the apparatus 10.

In embodiments wherein the levitation windings 42, 44, 62, 64 are "active" (i.e., configured as electromagnets), the algorithm 200 advances to process step 204 once the control circuit 132 detects or otherwise determines that the external power source 150 has been coupled to the apparatus 10. In process step 204, the levitation windings 42, 44, 62, 64 are energized to cause the toroidal rings 14, 16 to be levitated in the toroidal guideways 34, 36 via magnetic attraction. To do so, the control circuit 132 controls the switching circuitry 136 to distribute the electrical power from the external power source 150 to the levitation windings 42, 44, 62, 64.

The algorithm 200 subsequently advances to process step 206 in which the propulsion windings 46, 66 (i.e., electromagnets) are energized to cause the toroidal rings 14, 16 to begin moving (i.e., rotating) via magnetic attraction and repulsion. To do so, the control circuit 132 controls the switching circuitry 134, 138 to distribute the electrical power from the external power source 150 to the propulsion windings 46, 66. In embodiments wherein the levitation windings are "active", the process steps 204 and 206 may be executed contemporaneously or in any sequential order. For example, the levitation windings 42, 44, 62, 64 may be energized a brief time period prior to the energizing of the propulsion windings 46, 66. Alternatively, in embodiments wherein the levitation windings 42, 44, 62, 64 are "passive", the toroidal rings 14, 16 are levitated via the magnetic field generated by the windings 42, 44, 62, 64 when a current is induced therein by cooperation of the permanent magnets 22, 24, 52, 54 (i.e., while the permanent magnets 22, 24, 52, 54 pass over the levitation windings 42, 44, 62, 64). In such embodiments, the apparatus 10 may include a number of slides, wheels, or other low friction support mechanism configured to support the toroidal rings 14, 16 while not levitated (i.e., prior to the time when the levitation windings 42, 44, 62, 64 generate a sufficient magnetic field to levitate the rings 14, 16). Additionally, in embodiments wherein the apparatus 10 includes the cooling system 172, the control circuit 132 may distribute power from the external power source 150 to the cooling system 172 subsequently or contemporaneously with the energizing of the propulsion windings 46, 66 in process step 206.

In process step 208, the control circuit 132 determines if the rotational speed of the toroidal rings 14, 16 is equal to or greater than a predetermined operational rotational speed. To do so, the control circuit 132 receives data signals from the sensors 174, 176 indicative of the rotational speed of the toroidal rings 14, 16, respectively. The control circuit 132 compares the measured rotational speed of the toroidal rings 14, 16 to the predetermined operational rotational speed. In some embodiments, the predetermined operational rotational speed may be from about 6,000 RPM to about 85,000 RPM. However, the predetermined operational rotation speed may vary depending on the particular application of the apparatus 10. Regardless, if the rotational speed of the toroidal rings 14, 16 is lower than the predetermined operational rotational speed, the algorithm 200 loops back to the process steps 204 (and, in some embodiments, process step 206) wherein the propulsion windings 46, 66 (and the levitation windings 42, 44, 62, 64) are energized using the external power source 150. In this way, the algorithm 200 maintains the magnetic levitation of the toroidal rings 14, 16 via active or induced magnetic levitation and continues to rotate the toroidal rings 14, 16 until the predetermined operational rotational speed is achieved.

Once the toroidal rings 14, 16 are determined to be rotating at or greater than the predetermined operational rotational speed in process step 208, the algorithm 200 advances to process step 210. Additionally, in some embodiments, the operator of the apparatus 10 and/or the vehicle to which the apparatus 10 is coupled is notified that the toroidal rings 14, 16 are "charged" or otherwise rotating at or above the predetermined operational rotational speed. In process step 210, the algorithm 200 determines if the external power source 150 has been disconnected from the apparatus 10. If not, the algorithm 200 loops back to process steps 204 (and process step 206) to maintain the magnetic levitation and rotation of the toroidal rings 14, 16. However, if the algorithm 200 determines that the external power source 150 has been successfully decoupled from the apparatus 10, the algorithm 200 advances to process step 212. In some embodiments, if the algorithm 200 determines that the external power source 150 has been decoupled before the desired rotational speed has been achieved, the algorithm 200 loops back to process step 202.

In process step 212, the kinetic energy of the toroidal rings 14, 16 is converted to electrical energy (i.e., electrical power). To do so, the control circuit 132 couples the interconnect 140 with the interconnect 144 and the interconnect 152 with the interconnect 156 via switching circuitry 134, 138, respectively. Because the toroidal ring 14 is rotating, the permanent magnets 26 (or 112 and 114) cooperate with the propulsion windings 46 to form an electrical generator and supply an amount of electrical power to the control circuit 132 via interconnects 140 and 144. Similarly, because the toroidal ring 16 is rotating, the permanent magnets 56 (or 124 and 126) cooperate with the propulsion windings 66 to form an electrical generator and supply an amount of electrical power to the control circuit 132 via interconnects 152 and 156. In turn, the control circuit 132 distributes the electrical power. Specifically, in process step 214, the control circuit 132 distributes a portion of the electrical power to the vehicle power and other electronic circuitry 170. To do so, the control circuit 132 supplies or distributes a portion of the electrical power generated by the toroidal rings 14, 16 to the vehicle power and other electronic circuitry 170 via the interconnects 166.

In process step 216, the control circuit 132 maintains the levitation of the toroidal rings 14, 16. In embodiments wherein the levitation windings 42, 44, 62, 64 are "active" (i.e., configured as electromagnets), the algorithm 200 maintains the levitation of the rings 14, 16 via distributing a portion of the electrical energy generated in the process step 212 to the levitation windings 42, 44, 62, 64. To do so, the control circuit 132 controls the switching circuitry 136 to couple the interconnect 160 to the interconnect 164. In this way, the control circuit 132 provides electrical power by supplying or distributing a portion of the electrical power generated by the toroidal rings 14, 16 to the levitation windings 42, 44, 62, 64 via the interconnects 164, switching circuitry 136, and interconnects 160. Alternatively, in embodiments wherein the levitation windings are "passive", the levitation of the toroidal rings 14, 16 is maintained in the process step 216 via the magnetic fields generated by the levitation windings 42, 44, 62, 64 in response to the current induced via the passing by of the permanent magnets 22, 24, 52, 54.

In some embodiments, the algorithm 200 includes a process step 217 in which the toroidal rings 14, 16 are controlled. For example, in process step 217, the control system 132 may monitor and adjust the angular speed of the toroidal rings 14, 16 such that the net angular momentum is maintained at a negligible amount. For example, the amount of kinetic energy converted in process step 212 may be altered to thereby change the rotational speeds of the toroidal rings 14, 16. In other embodiments, such as embodiments wherein the apparatus 10 is used in an aircraft, the net angular momentum may be used as a yaw control. That is, the rotation speeds of one or both of the toroidal rings 14, 16 may be adjusted such that the orientation of the vehicle (e.g., aircraft) is controlled by establishing a sufficient net angular momentum. In addition, in embodiments wherein the levitation windings 42, 44, 62, 64 are "active," the voltage supplied to the levitation windings 42, 44, 62, 64 may be adjusted in process step 217 to thereby control the alignment of the rings 14, 16 in the guideways 34, 36.

In process step 218, the algorithm 200 determines if the rotational speed of the toroidal rings 14, 16 is greater than a predetermined minimum rotational speed. Because the toroidal rings 14, 16 will gradually slow down as rotational kinetic energy is converted into electrical energy, the rotational speed of the toroidal rings 14, 16 is determined and compared to the minimum rotational speed in process step 218. To do so, the control circuit 132 receives data signals indicative of the rotational speeds of the toroidal rings 14, 16 from the sensors 174, 176, respectively. The control circuit 132 compares the measured rotational speed of the toroidal rings with the predetermined minimum rotational speed. In some embodiments, the predetermined minimum rotational speed is about 5,000 RPM to about 10,000 RPM. However, the predetermined minimum rotational speed may vary depending on the particular application.

If the rotational speed of the toroidal rings 14, 16 is determined to be greater than the minimum rotational speed in process step 218, the algorithm 200 loops back to process steps 212, 214, 216 (and 217) wherein electrical power is generated and distributed and the levitation of the toroidal rings 14, 16 is maintained. However, if the rotational speed of the toroidal rings 14, 16 is determined to be less than the minimum rotational speed, the algorithm 200 advances to process step 220 wherein the operator of the apparatus 10, or of the vehicle (e.g., aircraft) to which the apparatus 10 supplies power, is alerted. The operator may be alerted via a visual, audible, or tactile indicator. For example, in some embodiments, a light is illuminated to warn the operator that toroidal rings 14, 16 are rotating at a rotational speed below the predetermined minimum operational rotational speed. Additionally or alternatively, an audible horn or buzzer may be activated to attract the attention of the operator. In this way, the operator is warned that the amount of electrical power capable of being produced is below the desired level and the operator act accordingly (e.g., land the aircraft). Alternatively, in some embodiments, the control circuit 132 may be configured to automatically begin the correct response, such as landing the aircraft. Once the operator is alerted in process step 220, the algorithm 200 advances to process step 222 in which the algorithm 200 determines if the rotational speed of the toroidal rings 14, 16 is at or about zero. That is, the control circuit 132 determines, via the sensors 174, 176, if the toroidal rings 14, 16 have slowed to a stationary or near-stationary position. If the toroidal rings 14, 16 are still rotating at some rotational speed, the algorithm 200 loops back to process steps 212, 214, and 216 such that all or nearly all of the available kinetic energy of the rotating toroidal rings is converted to electrical energy (i.e., electrical power). However, if the toroidal rings 14, 16 have slowed to a stationary or near-stationary position, the algorithm 200 loops back to process step 202 wherein the algorithm 200 waits or pauses until the external power source 150 is once again coupled to the apparatus 10 to "re-charge" the toroidal rings 14, 16.

Figure 10:
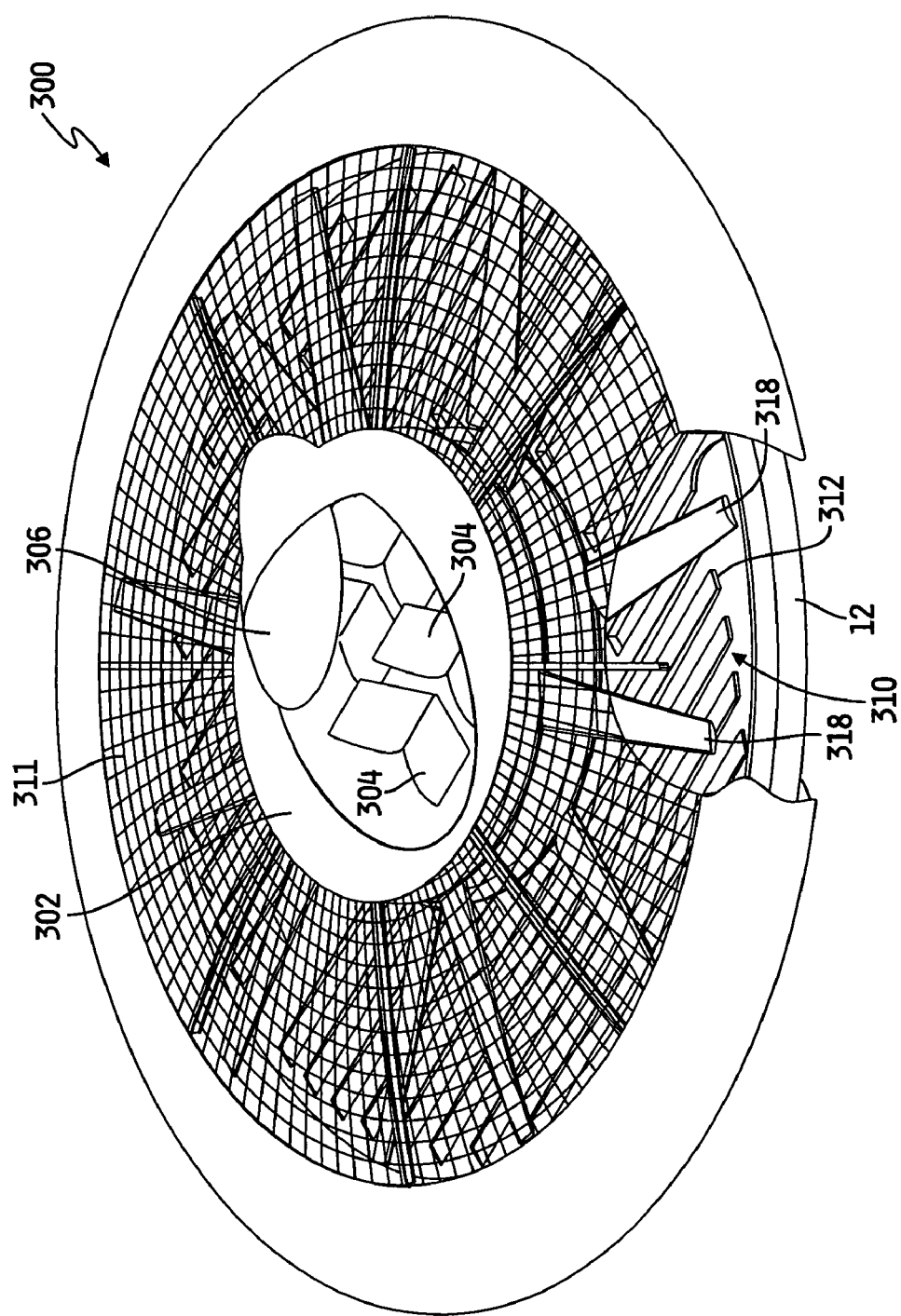
FIG. 10 is a perspective view of an aircraft powered by the control system of FIG. 8 and having portions cut-away to show the apparatus of FIG. 1.
Figure 11:
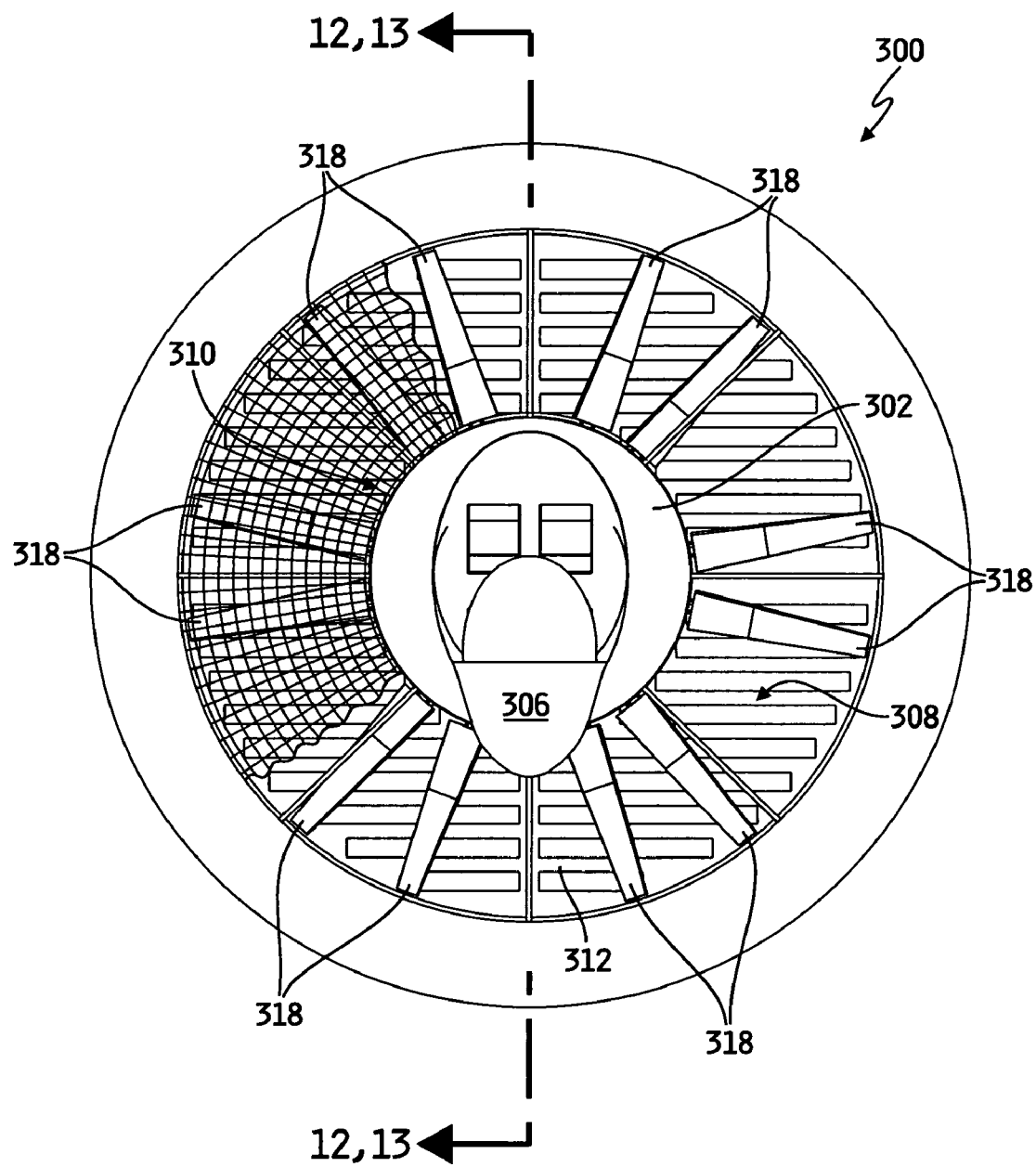
FIG. 11 is a plan view of the aircraft of FIG. 10.

It should be appreciated that in some embodiments the apparatus 10 may be used as the primary power source to provide electrical power to a vehicle and/or as a stabilizing device to provide a stabilizing effect to the vehicle. Referring to FIGS. 10 and 11, in one such embodiment, a ducted fan aircraft 300 includes the apparatus 10 as a primary power source. As shown in FIG. 10, the aircraft 300 has a substantially circular top cross-section and includes a centrally located fuselage 302. A number of operator and passenger seats 304 are positioned in the fuselage 302. A canopy 306 covers a top portion of the fuselage 302. The aircraft 300 also includes a rotor blade area 308. A rotor system 310 is positioned in the rotor blade area 308. A controllable vane duct 311 covers the top portion of the rotor blade area 308 while providing access for air to be collected or otherwise moved through the rotor blade area 308 by the rotor system 310. A controllable vane ducting system 312 covers a bottom portion of the rotor blade area 308 while providing access for air to be exhausted from or otherwise moved through the rotor blade area 308 by the rotor system 310. The controllable vane ducting system 312 also may provide lateral and rotational control to the aircraft during operation. The vane ducting systems 311 and 312 may be controlled to a closed position such that the systems 311 and 312 form solid, or substantially solid, airfoils that may provide lift to the aircraft during forward motion.

Figure 12:
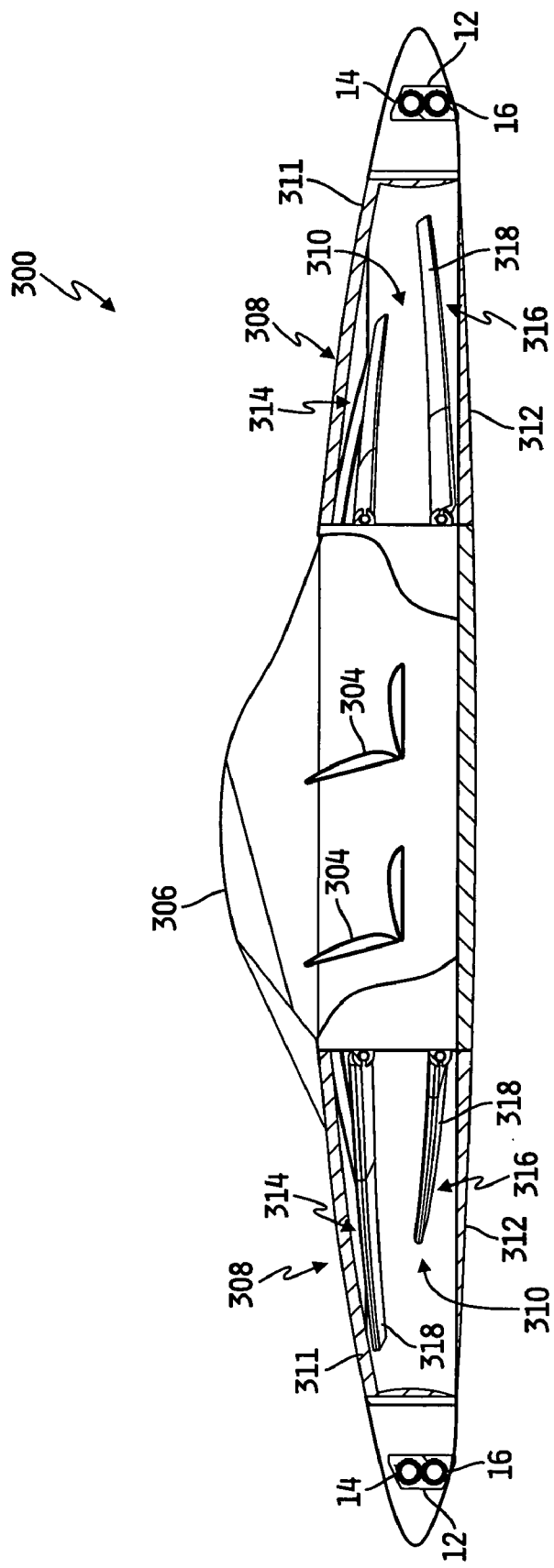
FIG. 12 is cross-sectional side elevation view of one embodiment of the aircraft of FIG. 10.
Figure 13:
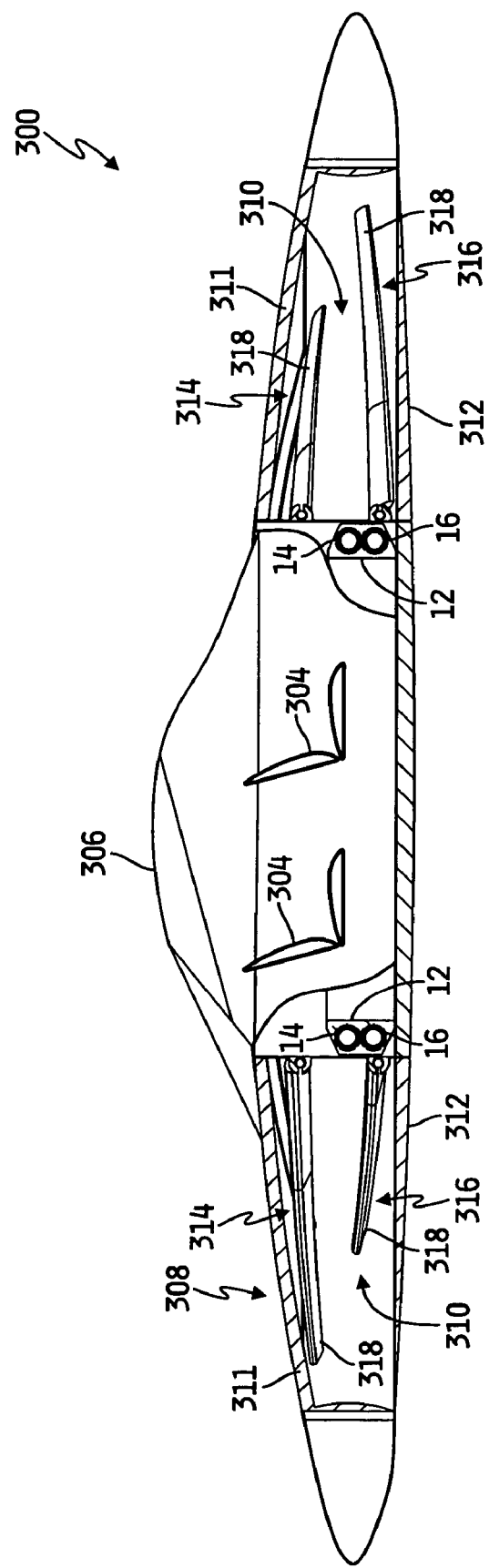
FIG. 13 is a cross-sectional side elevation view of another embodiment of the aircraft of FIG. 10.

As illustrated in FIGS. 12 and 13, the rotor system 310 includes a top rotor 314 and a bottom rotor 316. Each rotor 314, 316 includes a number of rotor blades 318. Illustratively, each rotor 314, 316 include six rotor blades, but in other embodiments, rotors having more or less rotor blades may be used. The rotors 314, 316 are positioned co-axially with each other and, when powered, rotate in counter directions such that the net angular momentum produced by the rotors 314, 316 is minimized. The rotors 314, 316 are vertically separated from each other to reduce or minimize turbulent flow energy loss. In one embodiment, the rotors 314, 316 are vertically separated by a distance of about 18 inches or greater. Illustratively, the rotors 314, 316 are powered by linear induction motors (LIM). However, in other embodiments, the rotors 314, 316 may be powered via one or more electrical motors. As well as providing vertical thrust, the individual rotor blades 318 may be use to provide directional thrust in some embodiments. In such embodiments, the rotor blades 318 may be collectively controlled (i.e., the pitch of each rotor blade 318 is adjusted in unison) or cyclically controlled (i.e., the pitch of each rotor blade 318 is selectively controlled depending on its position in the rotation plane). Additionally, in some embodiments, the distal ends of each rotor blade 318 may be slidably coupled to an outer portion of the frame via magnetically levitated radial bearings (not shown). In other embodiments, the aircraft 300 may include additional rotors or other means for propulsion to provide directional control and/or horizontal thrust.

Illustratively, the aircraft 300 includes two toroidal rings (e.g., toroidal rings 14, 16) positioned in a toroidal guideway (e.g., toroidal housing 12). However, it should be appreciated that in other embodiments, the aircraft 300 may include any number of toroidal rings. Typically, an even number of toroidal rings is used such that the toroidal rings may be configured to produce minimal net angular momentum. Additionally, the toroidal rings may be used to provide stability to the aircraft 300 while rotating. As illustrated in FIGS. 12 and 13, the toroidal housing 12 is positioned such that the housing 12 surrounds the fuselage 302. In one embodiment, as illustrated in FIG. 12, the toroidal housing 12 is positioned towards the outer circumference of the aircraft 300. In such an embodiment the toroidal housing 12 may have a diameter of about 28 feet. However, in another embodiment, as illustrated in FIG. 13, the toroidal housing 12 may be positioned toward the outer circumference of the fuselage 302. In such an embodiment, the toroidal housing 12 may have a diameter of about 8 feet, for example.

The aircraft 300 also includes the control system 130, which is illustrated in and described in regard to FIGS. 8 and 9, to control the operation of the toroidal rings 14, 16. As such, the aircraft 300 may be coupled to an external power source 150 to initially provide power to the propulsion windings 46, 66 to magnetically rotate the toroidal rings 14, 16 and, in some embodiments, to the levitation windings 42, 44, 62, 64 to magnetically levitate the toroidal rings 14, 16, as discussed above in regard to FIGS. 8 and 9. To minimize the net angular moment produced by the toroidal rings 14, 16 while rotating, the toroidal rings 14, 16 may be rotated in counter directions and at approximately the same rotational speed. Once the toroidal rings 14, 16 are rotating at the predetermined operational rotational speed, the external power source 150 may be decoupled from the aircraft 300. As discussed above in regard to FIGS. 8 and 9, the propulsion windings 46, 66 and the permanent magnets 26, 56 (or 112, 114 and 124, 126) form an electrical generator while the toroidal rings 14, 16 are rotating. The electrical power generated by the toroidal rings 14, 16 is distributed to the vehicle power and other electronic circuitry 170 and, in some embodiments, to the levitation windings 42, 44, 62, 64. For example, a portion of the generated electrical power is provided by the control circuit 132 to the rotor system 310 to move the aircraft 300. The aircraft 300 is illustratively a vertical takeoff and landing (VTOL) aircraft. As such, during take off, electrical power is provided to the rotor system 310 to cause the rotors 314, 316 to rotate to a sufficient rotational speed such that the rotor blades provide enough vertical thrust to elevate the aircraft 300. Once elevated, the direction of the aircraft 310 may be controlled via the air ducting system 312. That is, a number of individual vanes of the air ducting system 312 are controllable to allow the controlled exhaust of airflow passing through the rotor blade area 308. In this way, directional propulsion of the aircraft 300 can be achieved via the rotor system 310 and control of the air ducting system 312. Additionally or alternatively, the rotational speeds of the toroidal rings 14, 16 may be controlled or modified such that net angular movement provides a directional force to the aircraft 300. Further, in some embodiments, the aircraft 300 may include other rotors, propellers, turbines, or other thrust devices to provide directional control and/or thrust to the aircraft. In such embodiments, the air ducting systems 311, 312 may be partially or completely closed while the speed of rotors 314, 316 are reduced or stopped such that the shape of the aircraft provides lift based on the forward propulsion provided by the additional thrust device(s). The aircraft 300 may be operated in this manner until the toroidal rings 14, 16 slow to a rotational speed of or below the minimum rotational speed. After such a time, the aircraft 300 may be landed and the toroidal rings 14, 16 may be "re-charged" using an external power source 150.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure as defined by the appended claims.

The invention claimed is:

1. An apparatus for powering a vehicle, the apparatus providing electrical power to the vehicle and providing stability to the vehicle, the apparatus comprising:
a vehicle fuselage having a toroidal cavity with an internal pressure that is less than standard atmospheric pressure;
a toroidal ring positioned in the toroidal cavity, the toroidal ring including a magnetic material;
propulsion winding coupled with the fuselage and configured to generate an alternating magnetic field in the toroidal cavity to move the toroidal ring in response to a first power signal;
means for magnetically levitating the toroidal ring; and
electrical means for transferring power from the toroidal ring to the vehicle.

2. The apparatus of claim 1, wherein the propulsion winding is configured to cooperate with the magnetic material, while the toroidal ring is moving, to generate an amount of electrical power.

3. The apparatus of claim 2, wherein the propulsion winding is configured to provide electrical power to other electrical circuits.

4. The apparatus of claim 1, wherein the toroidal cavity has a substantially circular-shaped cross-section.

5. The apparatus of claim 1, wherein the toroidal ring comprises a carbon fiber composite material.

6. The apparatus of claim 1, wherein the toroidal ring has an outer diameter of about three feet to about fifty feet.

7. The apparatus of claim 1, wherein the toroidal ring has a cross-sectional diameter of about one inch to about six inches.

8. The apparatus of claim 1, wherein the magnetic material comprises a permanent magnet.

9. The apparatus of claim 8, wherein the permanent magnet is embedded in the toroidal ring.

10. The apparatus of claim 8, wherein the permanent magnet forms a portion of a Halbach array.

11. The apparatus of claim 8, wherein the permanent magnet is formed from a lanthanide alloy.

12. The apparatus of claim 1, wherein the magnetic material comprises a powdered magnetic material coupled with the toroidal ring.

13. The apparatus of claim 1, wherein the propulsion winding comprises a superconducting electromagnet.

14. The apparatus of claim 1, wherein the propulsion winding comprises at least one coil.

15. The apparatus of claim 1, wherein the propulsion winding is formed from a niobium alloy.

16. The apparatus of claim 1, wherein at least a portion of the magnetic material is positioned within at least a portion of the alternating magnetic field generated by at least a portion of the propulsion winding.

17. The apparatus of claim 1, wherein the propulsion winding forms a portion of a motor-generator.

18. The apparatus of claim 1, wherein the first power signal is an alternating current signal.

19. The apparatus of claim 1, wherein the first power signal powers a first portion of the propulsion winding for a first time period and a second portion of the propulsion winding for a second time period.

20. The apparatus of claim 1, wherein the propulsion winding is configured to generate an alternating magnetic field in the toroidal cavity to rotate the toroidal ring to a rotational speed of about 10,000 revolutions per minute to about 85,000 revolutions per minute.

21. The apparatus of claim 1, further comprising a control circuit configured to produce the first power signal.

22. The apparatus of claim 21, wherein the control circuit is configured to produce the first power signal using an external power source.

23. The apparatus of claim 21, further comprising a sensor coupled with the fuselage and the control circuit, the sensor producing a data signal indicative of the rotational speed of the toroidal ring.

24. The apparatus of claim 23, wherein the control circuit is configured to adjust the first power signal in response to the data signal.

25. The apparatus of claim 1, further comprising a cooling system configured to cool the propulsion winding.

26. The apparatus of claim 1, further comprising a levitation winding coupled with the fuselage and configured to generate a magnetic field to levitate the toroidal ring in the toroidal cavity.

27. The apparatus of claim 26, wherein the levitation winding includes an electromagnet configured to generate the magnetic field in response to a second power signal.

28. The apparatus of claim 26, wherein the levitation winding includes a laminated material having a number of parallel slots.

29. The apparatus of claim 26, wherein the levitation winding forms a Litz wire ladder track.

30. The apparatus of claim 26, wherein the fuselage comprises a protrusion extending into the toroidal cavity, the levitation winding being coupled with the protrusion.

31. The apparatus of claim 1, wherein the fuselage includes a protrusion extending into the toroidal cavity, the propulsion winding being coupled with the protrusion.

32. The apparatus of claim 1, wherein the vehicle is an aircraft.

33. The apparatus of claim 1, wherein the toroidal ring includes an inner cavity.

34. The apparatus of claim 1, wherein the propulsion winding is configured to generate power for a thrust apparatus of the vehicle.

35. The apparatus of claim 1, wherein the toroidal ring is configured to increase the stability of the vehicle while the toroidal ring is moving.

36. The apparatus of claim 1, further comprising means for stabilizing the vehicle.

37. The apparatus of claim 1, further comprising means for transferring electrical power from the ring to the vehicle, and means for providing gyroscopic stability to the vehicle.

38. An aircraft comprising:
a fuselage;
a housing surrounding the fuselage and defining a toroidal cavity;
a toroidal ring positioned in the toroidal cavity and having a magnetic material coupled therewith;
a propulsion winding coupled with the housing and configured to generate an alternating magnetic field in the toroidal cavity to rotate the toroidal ring in response to a power signal and to otherwise cooperate with the magnetic material, while the toroidal ring is rotating, to generate electrical power;
a levitation winding coupled with the housing and configured to generate a magnetic field to levitate the toroidal ring in the toroidal cavity;
a first number of rotor blades coupled with the fuselage;
means for rotating the first number of rotor blades;
a control circuit configured to produce the power signal; and
electrical means for transferring power from the toroidal ring to the aircraft;
wherein the toroidal cavity has an internal pressure that is less than standard atmospheric pressure.

39. A power source for a vehicle, the power source comprising
a housing defining a first toroidal cavity depressurized to form a vacuum and a second toroidal cavity depressurized to form a vacuum;
a first toroidal ring positioned in the first toroidal cavity and having a first magnetic material coupled thereto;
a first propulsion winding coupled with the housing and configured to generate a first alternating magnetic field in the first toroidal cavity to move the first toroidal ring to rotate in a first direction in response to a first power signal;
a second toroidal ring positioned in the second toroidal cavity and having a second magnetic material coupled thereto; and
a second propulsion winding coupled with the housing and configured to generate a second alternating magnetic field in the second toroidal cavity to move the second toroidal ring to rotate in a second direction different from the first direction in response to a second power signal.

40. The apparatus of claim 39, further including yaw control of the vehicle by adjusting rotation speeds of one or both of the toroidal rings.

41. A power source for a vehicle, the power source comprising
a housing defining a first toroidal cavity depressurized to form a vacuum and a second toroidal cavity depressurized to form a vacuum;
a first toroidal ring positioned in the first toroidal cavity and having a first magnetic material coupled thereto;
a first propulsion winding coupled with the housing and configured to generate a first alternating magnetic field in the first toroidal cavity to move the first toroidal ring in response to a first power signal to spin the first toroidal ring at a rotational speed of from about 40,000 rpm to about 85,000 rpm;
a second toroidal ring positioned in the second toroidal cavity and having a second magnetic material coupled thereto;
a second propulsion winding coupled with the housing and configured to generate a second alternating magnetic field in the second toroidal cavity to move the second toroidal ring in response to a second power signal, and
electrical means for transferring power from the rings to the vehicle.

42. A power source for a vehicle, the power source comprising:
a housing defining a first toroidal cavity and a second toroidal cavity;
a first toroidal ring positioned in the first toroidal cavity and having a first magnetic material coupled thereto;
a first propulsion winding coupled with the housing and configured to generate a first alternating magnetic field in the first toroidal cavity to move the first toroidal ring to rotate at a first speed in response to a first power signal;
a second toroidal ring positioned in the second toroidal cavity and having a second magnetic material coupled thereto; and a second propulsion winding coupled with the housing and configured to generate a second alternating magnetic field in the second toroidal cavity to move the second toroidal ring to rotate at a second speed in response to a second power signal;

wherein each of the first and second toroidal cavities has an internal pressure that is less than standard atmospheric pressure.

43. The apparatus of claim 42, wherein the first magnetic material includes a first permanent magnet and the second magnetic material includes a second permanent magnet.

44. The apparatus of claim 43, wherein the first and second permanent magnets are formed from a lanthanide alloy.

45. The apparatus of claim 43, wherein at least one of the first and the second permanent magnet forms a portion of a Halbach array.

46. The apparatus of claim 42, wherein first and second propulsion windings are formed from a niobium alloy.

47. The apparatus of claim 42, wherein the first and second power signals are alternating current signals.

48. The apparatus of claim 42, further comprising a first sensor and a second sensor coupled with the housing and a control circuit, the first sensor producing a first data signal indicative of a rotational speed of the first toroidal ring and the second sensor producing a second data signal indicative of a rotational speed of the second toroidal ring.

49. The apparatus of claim 42, wherein the vehicle is an aircraft.

50. The apparatus of claim 42, wherein the first and second toroidal rings are configured to provide stability to the vehicle while the first and second toroidal rings are moving.

51. The apparatus of claim 42, further including yaw control of the vehicle by adjusting rotation speeds of one or both of the toroidal rings.

52. The apparatus of claim 42, further including a control for adjusting the relative rotation speeds of the toroidal rings.

53. The apparatus of claim 42, wherein the first toroidal ring includes a first vertical axis and the second toroidal ring includes a second vertical axis, the first and second vertical axes being substantially aligned.

54. The apparatus of claim 53, further comprising a control circuit configured to produce the first and second power signals.

55. The apparatus of claim 54, wherein the control circuit is configured to control the rotational speeds of the first and second toroidal rings such that the rotation of the first and second toroidal rings generates a predetermined net angular momentum.

56. The apparatus of claim 54, wherein the control circuit is configured to produce the first and second power signals using an external power source.

57. The apparatus of claim 53, further comprising (i) a first levitation winding coupled with the housing and configured to generate a first magnetic field to levitate the first toroidal ring in the first toroidal cavity and (ii) a second levitation winding coupled with the housing and configured to generate a second magnetic field to levitate the second toroidal ring in the second toroidal cavity.

58. The apparatus of claim 57, wherein the first levitation winding comprises a first electromagnet configured to generate the first magnetic field in response to a third power signal and the second levitation winding comprises a second electromagnet configured to generate the second magnetic field in response to a fourth power signal.

59. The apparatus of claim 57, wherein the first and second levitation windings are formed from a laminated material having a number of parallel slots.

60. The apparatus of claim 42, wherein the first propulsion winding comprises a first electromagnet configured to generate the first alternating magnetic field to rotate the first toroidal ring to a first rotational speed and the second propulsion winding comprises a second electromagnet configured to generate the second alternating magnetic field to rotate the second toroidal ring to a second rotational speed.

61. The apparatus of claim 60, wherein the first and the second rotational speeds are approximately equal.

62. The apparatus of claim 60, wherein the first and second rotational speeds are about 45,000 revolutions per minute to about 85,000 revolutions per minute.

* * * * *